(12) United States Patent
Kole et al.

(10) Patent No.: US 12,269,549 B2
(45) Date of Patent: Apr. 8, 2025

(54) VEHICLE SEAT ADJUSTMENT AND SECURING SYSTEMS AND METHODS

(71) Applicant: Lyft, Inc., San Francisco, CA (US)

(72) Inventors: Jared Mitchell Kole, San Jose, CA (US); Alejandro Salvador Garcia, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 18/489,582

(22) Filed: Oct. 18, 2023

(65) Prior Publication Data

US 2024/0101208 A1 Mar. 28, 2024

Related U.S. Application Data

(63) Continuation of application No. 16/792,177, filed on Feb. 14, 2020, now Pat. No. 11,834,120.

(51) Int. Cl.
*B62J 1/08* (2006.01)
(52) U.S. Cl.
CPC ............ *B62J 1/08* (2013.01); *B62J 2001/085* (2013.01)
(58) Field of Classification Search
CPC ....... B62J 1/08; B62J 2001/085; B62H 5/003; B62H 2003/005; B62K 3/002; B62M 6/40
See application file for complete search history.

(56) References Cited

U.S. PATENT DOCUMENTS

| | | | | |
|---|---|---|---|---|
| 7,722,129 | B2 * | 5/2010 | Cusack | B62K 25/02 |
| | | | | 301/124.2 |
| 9,512,947 | B2 * | 12/2016 | Giraldi | F16L 35/00 |
| D803,757 | S * | 11/2017 | Giordano | D12/415 |
| D809,991 | S * | 2/2018 | Giordano | D12/415 |
| 2013/0312231 | A1 * | 11/2013 | Lah | F16B 7/1418 |
| | | | | 24/457 |
| 2019/0077478 | A1 * | 3/2019 | Hu | B62K 19/36 |
| 2020/0094904 | A1 * | 3/2020 | LaBaere | B62K 5/05 |

* cited by examiner

*Primary Examiner* — Mark R Wendell
(74) *Attorney, Agent, or Firm* — Baker Botts L.L.P.

(57) ABSTRACT

Systems and methods related to seat clamp assemblies for micro-mobility transit vehicles are disclosed. A seat post clamp assembly may include a seat clamp configured to physically secure the seat post clamp assembly to a seat post tube of the micro-mobility transit vehicle. The seat clamp may further include an adjustment handle coupled to the seat clamp via a first fastener and a second fastener. The first fastener may be inserted through a first through-hole of the seat clamp, a second through-hole of the seat clamp, and a first fastener slot disposed in the adjustment handle. The first fastener may be received in a first axle disposed in the adjustment handle. The second fastener may be inserted through a third through-hole of the seat clamp and a second fastener slot of the adjustment handle. The second fastener may be received in a second axle disposed in the adjustment handle.

20 Claims, 27 Drawing Sheets

VEHICLE SEAT ADJUSTMENT AND SECURING SYSTEMS AND METHODS

PRIORITY

This application is a continuation under 35 U.S.C. § 120 of U.S. patent application Ser. No. 16/792,177, filed 14 Feb. 2020 and issued as U.S. Pat. No. 11,834,120 on 5 Dec. 2023, which is incorporated herein by reference. This application is related to U.S. Design application No. 29/729,832, filed 30 Mar. 2020, now issued as U.S. Pat. No. D983,028 on 11 Apr. 2023.

TECHNICAL FIELD

One or more embodiments of the present disclosure relate generally to vehicle seats and more particularly, for example, to vehicle seat adjustment and securing systems and methods.

BACKGROUND

A transit vehicle may serve numerous individuals each day. Individuals may have various limb lengths, body sizes, weights, etc. Thus, various components of the transit vehicle may need to be adjusted several times throughout the day to suit an individual's comfortability. For example, a seat post may need to be adjusted such that an individual may be able to comfortably sit on a seat of the transit vehicle and operate the transit vehicle. Since a seat post may experience a high volume of use and consequently a high volume of adjustments, mechanisms for securing the seat post oftentimes become a failure point. For example, a mechanism for securing the seat post may become loose, which results in costly maintenance and servicing issues.

Therefore, there is a need in the art for improved vehicle adjustment and securing systems and methods. Such systems and methods should provide durability such that a seat post on a transit vehicle can be securely adjusted after extensive use by numerous individuals throughout the day. Such systems and methods should also provide for a convenient way to adjust the seat post and enjoy a comfortable ride on the transit vehicle.

SUMMARY

Techniques are disclosed for systems and methods related to seat clamp assemblies for micro-mobility transit vehicles. In an example embodiment, a seat post clamp assembly for a micro-mobility transit vehicle includes a seat clamp configured to physically secure the seat post clamp assembly to a seat post tube of the micro-mobility transit vehicle. The seat post clamp assembly further includes an adjustment handle coupled to the seat clamp via a first fastener and a second fastener. The first fastener may be inserted through a first through-hole of the seat clamp, a second through-hole of the seat clamp, and a first fastener slot disposed in the adjustment handle. The first fastener may be received in a first axle disposed in the adjustment handle. A second fastener is inserted through a third through-hole of the seat clamp and a second fastener slot of the adjustment handle. The second fastener may be received in a second axle disposed in the adjustment handle.

In various embodiments, a method for using the seat post clamp assembly is disclosed. The method may include rotating the adjustment handle into an open position to reduce a clamp force of a seat clamp around a seat post tube of a micro-mobility transit vehicle. The method may further include adjusting a seat post of the micro-mobility vehicle where the seat post is partially inside the seat post tube. The adjustment handle may be rotated into a closed position to increase the clamp force of the seat clamp around the seat post tube such that the seat post is secured in a position inside the seat post tube.

According to one or more embodiments, a method for assembling a seat post clamp assembly is disclosed. The method may include inserting the first fastener through a first through-hole of a seat clamp of the seat post clamp assembly, a second through-hole of the seat clamp, and a first fastener slot disposed in an adjustment handle of the seat post clamp assembly. The method may further include receiving the first fastener via a first axle disposed in the adjustment handle. A second fastener may be inserted through a third through-hole of the seat clamp and a second fastener slot of the adjustment handle. The second fastener may be received via a second axle disposed in the adjustment handle.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
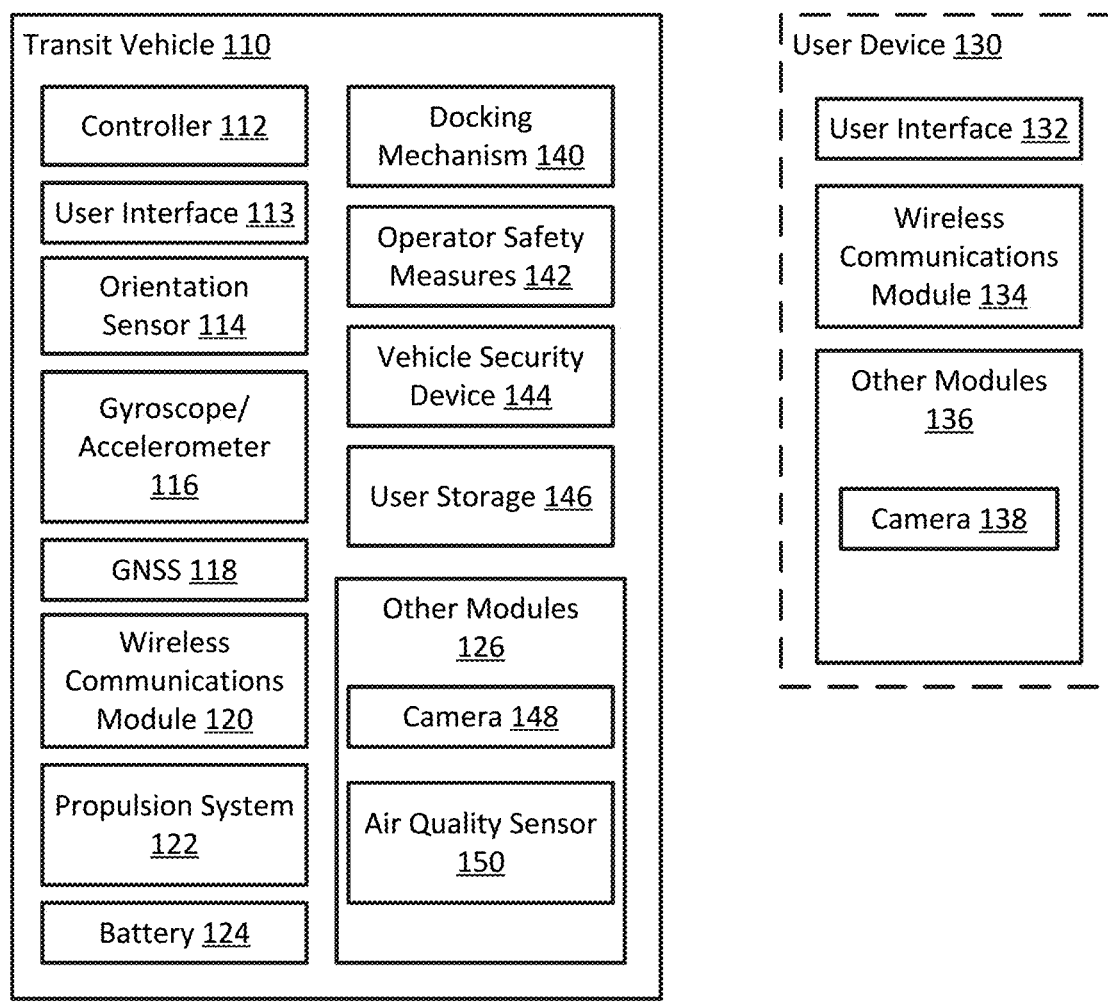
FIG. 1 illustrates a block diagram of a portion of a dynamic transportation matching system including a transit vehicle in accordance with an embodiment of the disclosure.

In accordance with various embodiments of the present disclosure, seat post clamp assemblies for micro-mobility transit vehicles and related methodologies are provided to reduce burdens associated with servicing micro-mobility transit vehicles (e.g., electric kick scooters, bicycles, motor scooters, and/or other vehicles generally designed to transport one or two people at once). For example, a seat post clamp assembly may include a seat post clamp configured to physically secure the seat post clamp assembly to a number of different micro-mobility transit vehicles and/or different types of micro-mobility transit vehicles, such that manufacturing efficiencies can be realized for overall reduced capital investment expenditures related to maintaining an operational fleet of such transit vehicles. Moreover, the seat post clamp assembly may be made less costly and may be designed and/or configured to increase ease of seat post adjustment (e.g., a seat post may extend or telescope from a seat post tube to increase or decrease a height of a seat) for micro-mobility transit vehicles as well as provide extra durability to endure a high volume of rides and seat post adjustments made by transportation requesters.

In various embodiments, a seat post clamp assembly may include a seat post clamp configured to physically secure the seat post clamp assembly to a seat post tube of a transit vehicle. For example, the seat clamp may have a lip (e.g., rim, ridge, edge) on an inner surface of the seat clamp that may be placed in contact with an end of the seat post tube to secure the seat clamp to the end of the seat post and prevent the seat clamp from sliding down the seat post tube. A first fastener may be inserted through two through-holes of the seat clamp and a first fastener slot of an adjustment handle of the seat post clamp assembly. An axle disposed in an adjustment handle of the seat post clamp assembly may be configured to receive the first fastener. A second fastener may be inserted through a third through-hole and a second fastener slot of the adjustment handle. A second axle disposed in the adjustment handle may be configured to receive the second fastener. In some embodiments, the first fastener and second fastener may be inserted through various washers disposed between the seat clamp and the adjustment handle. The first and second fastener slots of the adjustment handle may be configured to allow the adjustment handle to rotate about an axis substantially parallel to a line from a point between the first and second through-holes and a point within the third through-hole. According to some embodiments, when the adjustment handle is rotated to a position such that a length of the adjustment handle is adjacent to the seat post tube of the transit vehicle, the seat post may be securely fastened in place as the seat clamp is engaged to tighten the seat post tube against the seat post. According to some embodiments, when the adjustment handle is rotated to a position that the length of the adjustment handle exceeds a certain angular degree amount away from the seat post tube, the seat clamp is disengaged to loosen the seat post tube against the seat post such that the seat post may be adjusted for height.

FIG. 1 illustrates a block diagram of a portion of a dynamic transportation matching system (e.g., system 100) including a transit vehicle 110 in accordance with an embodiment of the disclosure. In the embodiment shown in FIG. 1, system 100 includes transit vehicle 110 and optional user device 130. In general, transit vehicle 110 may be a passenger vehicle designed to transport a single user (e.g., a micro-mobility transit vehicle) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micro-mobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a manager/servicer providing transit vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ride-sharing or ridesourcing applications typically executed on a mobile user device, such as user device 130 as described herein. Optional user device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of transit vehicle 110 may be substantially manual, autonomous, and/or partially or completely controlled by optional user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory or data storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 123 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of transit vehicle 110 and/or system 100. In further embodiments, other modules 126 may include a light, such as a headlight or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility transit vehicle, as described herein.

Transit vehicles implemented as micro-mobility transit vehicles may include a variety of additional features designed to facilitate transit management and user and environmental safety. For example, as shown in FIG. 1, transit vehicle 110 may include one or more of docking mechanism 140, operator safety measures 142, vehicle security device 144, and/or user storage 146, as described in more detail herein.

In particular, in some embodiments, operator safety measures 142 may be implemented as one or more of a headlight, a taillight, ambient lighting, a programmable lighting element (e.g., a multi-color panel, strip, or array of individual light elements, such as addressable light emitting diodes (LEDs), recessed and/or directional lighting, actuated lighting (e.g., articulated lighting coupled to an actuator), and/or other lighting coupled to and/or associated with transit vehicle 110 and controlled by controller 112. In other embodiments, operator safety measures 142 may include a speaker or other audio element configured to generate an audible alarm or sound to warn a rider or passersby of a detected safety concern, for example, or to inform a rider of a potential safety concern. More generally, operator safety measures 142 may be any electronic, mechanical, or electromechanical device or subsystem configured to increase the safety of a rider and/or mitigate potential harm to a rider under nominal operating conditions.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory or data storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
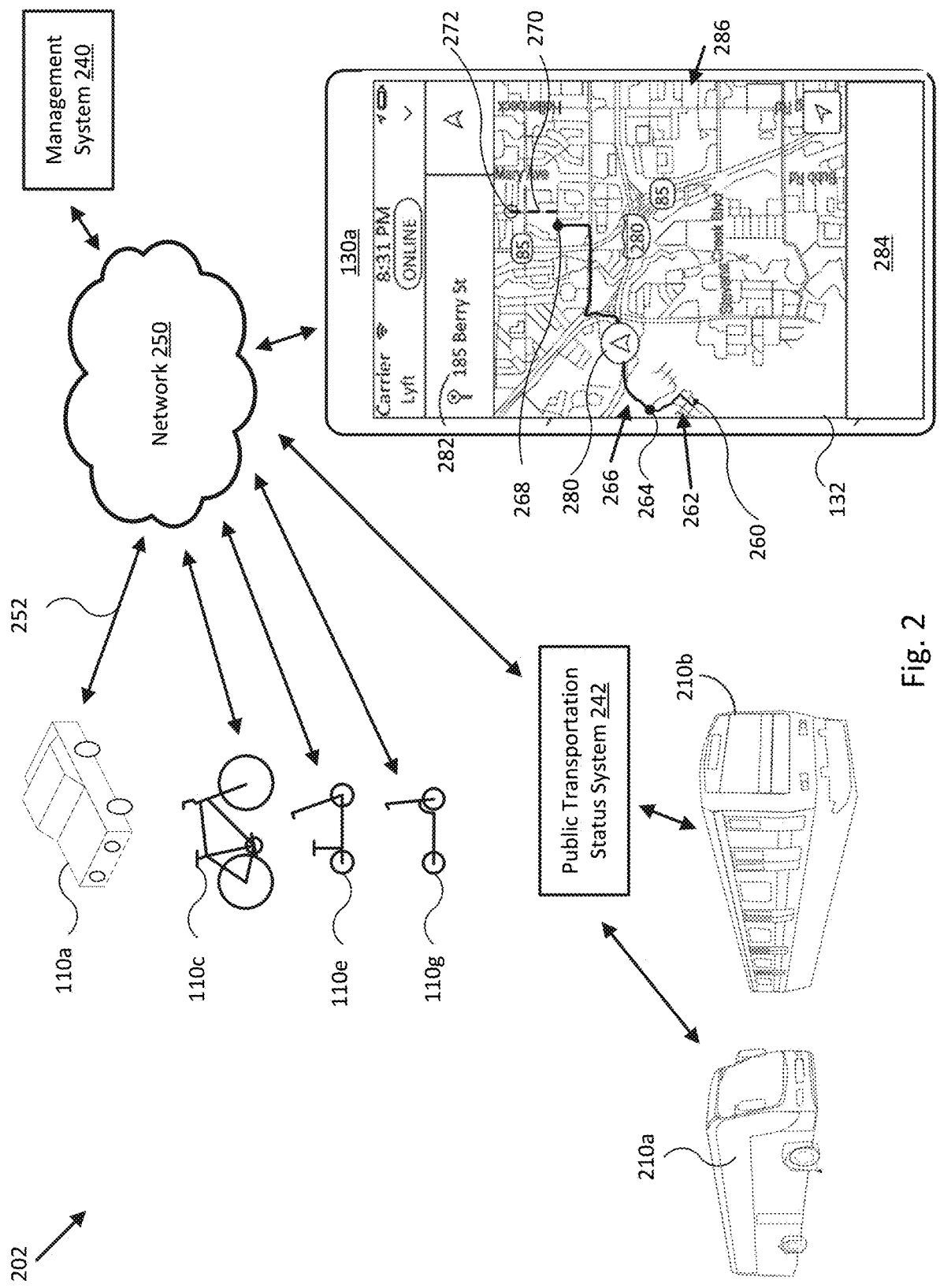
FIG. 2 illustrates a block diagram of a dynamic transportation matching system incorporating a variety of transportation modalities in accordance with embodiments of the disclosure.

FIG. 2 illustrates a block diagram of dynamic transportation matching system 200 incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey transit vehicle data and/or transit vehicle status data amongst themselves and/or to and from management system 240.

In FIG. 2, a requestor may use user device 130a to hire or rent one of transit vehicles 110a-d by transmitting a transportation request to management system 240 over WAN 250, allowing management system 240 to poll status of transit vehicles 110a-d and to select one of transit vehicles 110a-d to fulfill the transportation request; receiving a fulfillment notice from management system 240 and/or from the selected transit vehicle, and receiving navigation instructions to proceed to or otherwise meet with the selected transit vehicle. A similar process may be used by a requestor using user device 130b, but where the requestor is able to enable a transit vehicle over local communication link 263, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a user attempting to travel from origination point 260 to destination 272 using different transportation modalities (e.g., a planned multimodal route), as depicted in route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such planned multimodal route may include, for example, walking route 262 from origination point 260 to bus stop 264, bus route 266 from bus stop 264 to bus stop 268, and micro-mobility route 270 (e.g., using one of micro-mobility transit vehicles 110b, 110c, or 110d) from bus stop 268 to destination 272. Also shown rendered by user interface 132 are present location indicator 280 (indicating a present absolute position of user device 130a on street map 286), navigation destination selector/indicator 282 (e.g., configured to allow a user to input a desired navigation destination), and notice window 284 (e.g., used to render fleet status data, including user notices and/or alerts, as described herein). For example, a user may use navigation destination selector/indicator 282 to provide and/or change destination 272, as well as change any leg or modality of the multimodal route from origination point 260 to destination 272. In some embodiments, notice window 284 may display instructions for traveling to a next waypoint along the determined multimodal route (e.g., directions to walk to a bus stop, directions to ride a micro-mobility transit vehicle to a next stop along the route, etc.).

In various embodiments, management system 240 may be configured to provide or suggest an optimal multimodal route to a user (e.g., initially and/or while traversing a particular planned route), and a user may select or make changes to such route through manipulation of user device 130a, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share transit vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
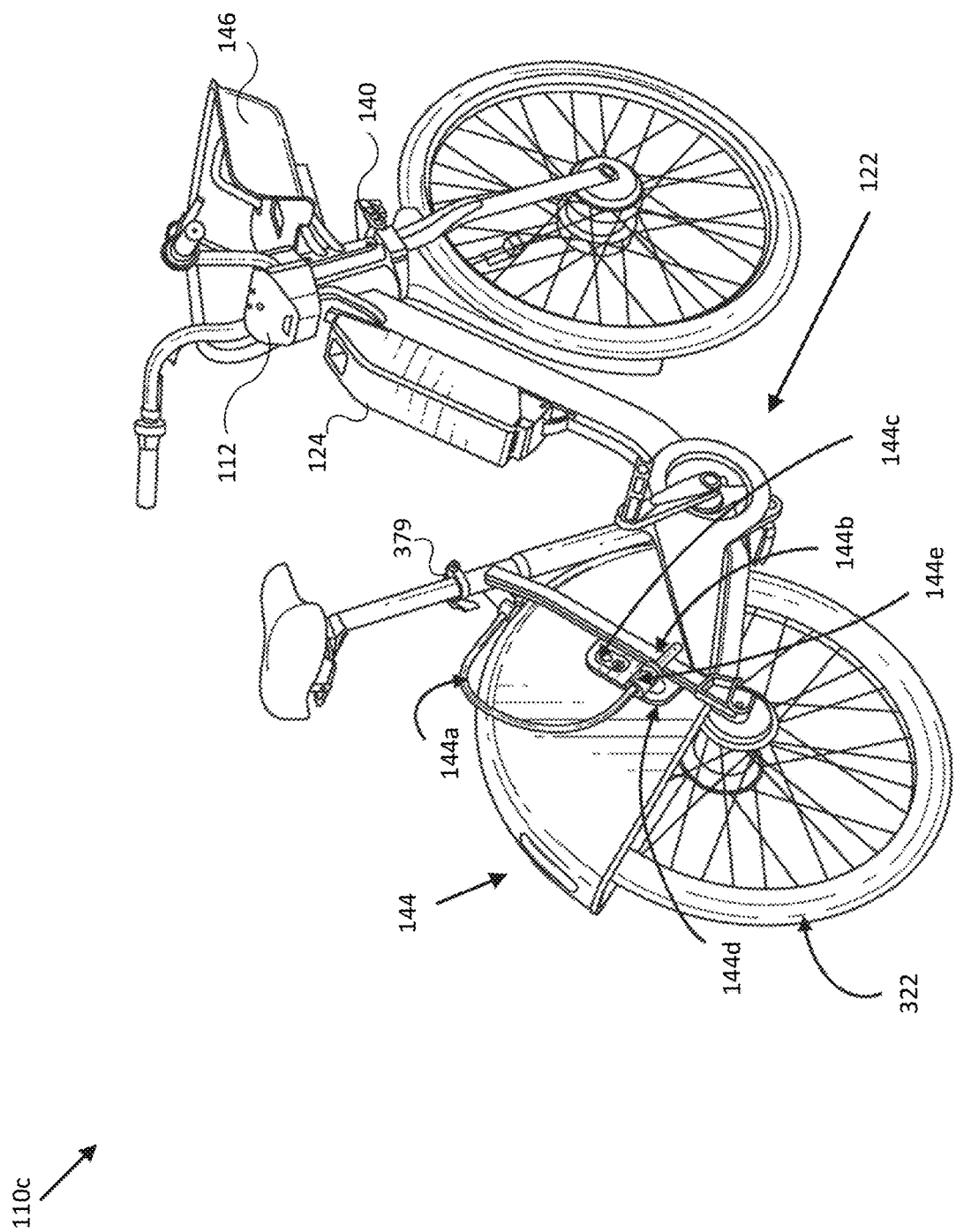
FIGS. 3A-3D illustrate diagrams of micro-mobility transit vehicles for use in a dynamic transportation matching system in accordance with embodiments of the disclosure.
Figure 3B:
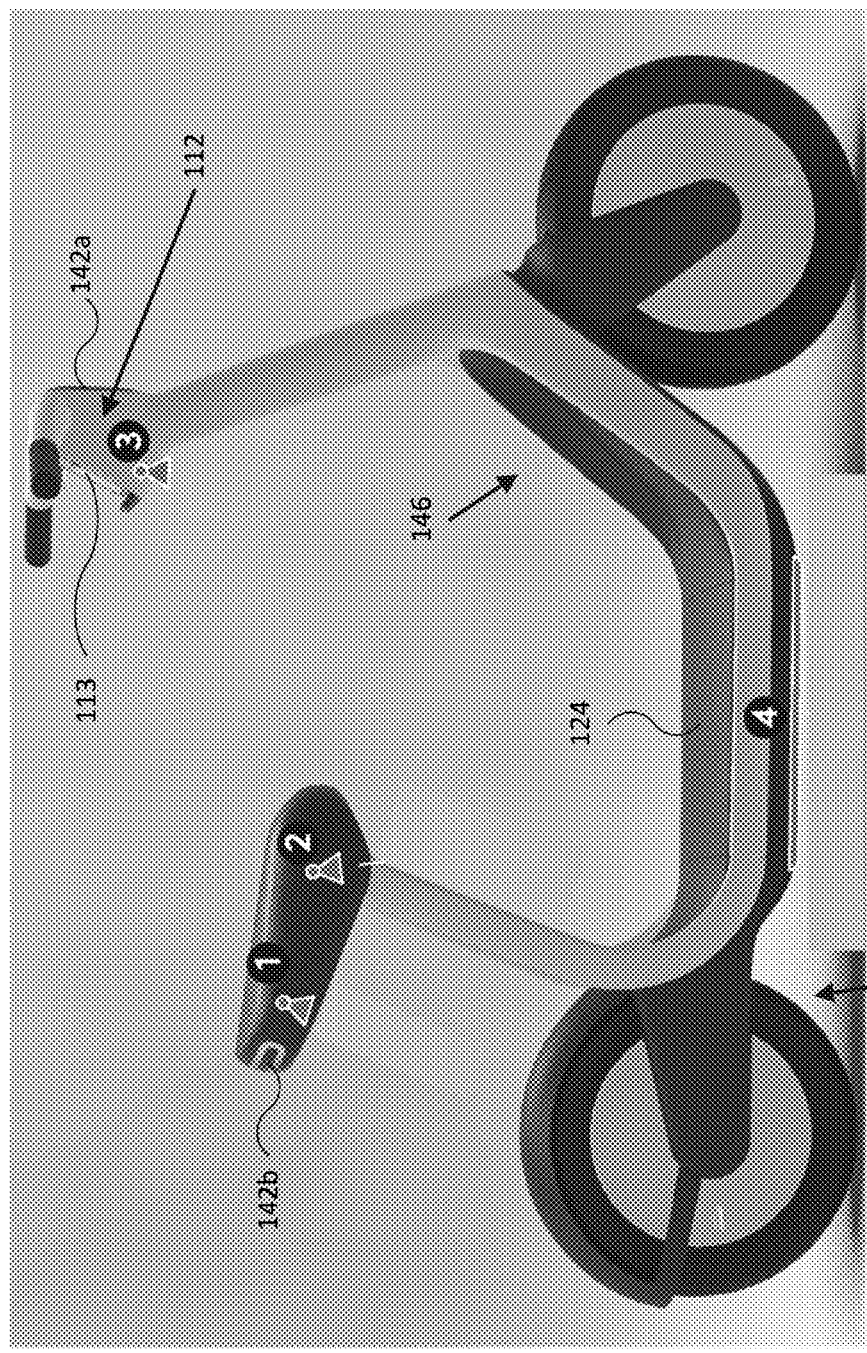
Figure 3C:
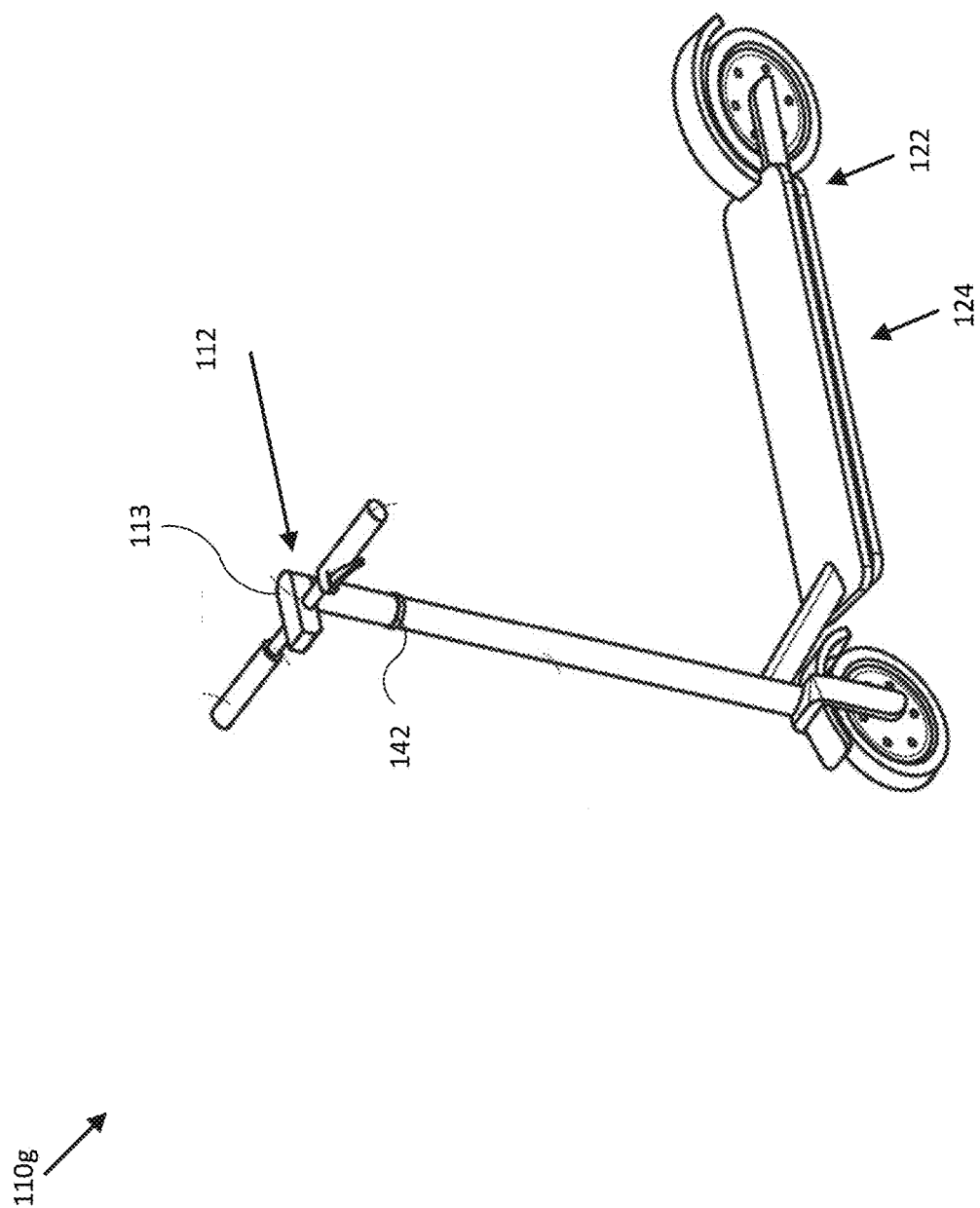

FIGS. 3A-C illustrate diagrams of micro-mobility transit vehicles 110b, 110c, and 110d, which may be integrated with mobile mesh network provisioning systems in accordance with an embodiment of the disclosure. For example, transit vehicle 110b of FIG. 3A may correspond to a motorized bicycle for hire that is integrated with the various elements of system 100 and may be configured to participate in dynamic transportation matching system 200 of FIG. 2. As shown, transit vehicle 110b includes controller/user interface/wireless communications module 112/113/120 (e.g., integrated with a rear fender of transit vehicle 110b), propulsion system 122 configured to provide motive power to at least one of the wheels (e.g., a rear wheel 322) of transit vehicle 110b, battery 124 for powering propulsion system 122 and/or other elements of transit vehicle 110b, docking mechanism 140 (e.g., a spade lock assembly) for docking transit vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilizing rear wheel 322 of transit vehicle 110*b*, such as by engaging pin 144*b* with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144*c*. In various embodiments, vehicle security device 144 may be configured to immobilize transit vehicle 110*b* by default, thereby requiring a user to transmit a hire request to management system 240 (e.g., via user device 130) to hire transit vehicle 110*b* before attempting to use transit vehicle 110*b*. The hire request may identify transit vehicle 110*b* based on an identifier (e.g., a QR code, a barcode, a serial number, etc.) presented on transit vehicle 110*b* (e.g., such as by user interface 113 on a rear fender of transit vehicle 110*b*). Once the hire request is approved (e.g., payment is processed), management system 240 may transmit an unlock signal to transit vehicle 110*b* (e.g., via network 250). Upon receiving the unlock signal, transit vehicle 110*b* (e.g., controller 112 of transit vehicle 110*b*) may release vehicle security device 144 and unlock rear wheel 322 of transit vehicle 110*b*.

Transit vehicle 110*c* of FIG. 3B may correspond to a motorized sit-scooter for hire that is integrated with the various elements of system 100 and may be configured to participate in dynamic transportation matching system 200 of FIG. 2. As shown in FIG. 3B, transit vehicle 110*c* includes many of the same elements as those discussed with respect to transit vehicle 110*b* of FIG. 3A. For example, transit vehicle 110*c* may include user interface 113, propulsion system 122, battery 124, controller/wireless communications module/cockpit enclosure 112/120/312, user storage 146 (e.g., implemented as a storage recess), and operator safety measures 142*a* and 142*b*, which may be implemented as various types of headlight assemblies, taillight assemblies, programmable light elements/strips/spotlights, and/or reflective strips, as described herein. As shown in FIG. 3B, transit vehicle 110*c* may also be implemented with various other vehicle light assemblies to increase visibility, to provide ambient lighting, and/or to provide lighted beaconing, as described herein. Additionally, as shown in FIG. 3B, transit vehicle 110*c* may include a seat post clamp assembly 379 configured to adjust between an open and closed position such that a seat post extending from a seat post tube of the frame of transit vehicle 110*c* may be adjusted in height and securely locked into position as described herein. For example, seat post clamp assembly 379 may be seat post clamp assembly 400 of FIG. 4.

Transit vehicle 110*d* of FIG. 3C may correspond to a motorized stand or kick scooter for hire that is integrated with the various elements of system 100 and may be configured to participate in dynamic transportation matching system 200 of FIG. 2. As shown in FIG. 3C, transit vehicle 110*d* includes many of the same elements as those discussed with respect to transit vehicle 110*b* of FIG. 3A. For example, transit vehicle 110*d* may include user interface 113, propulsion system 122, battery 124, controller/wireless communications module/cockpit enclosure 112/120/312, and operator safety measures 142, which may be implemented as various types of programmable light strips and/or reflective strips, as shown.

Figure 3D:
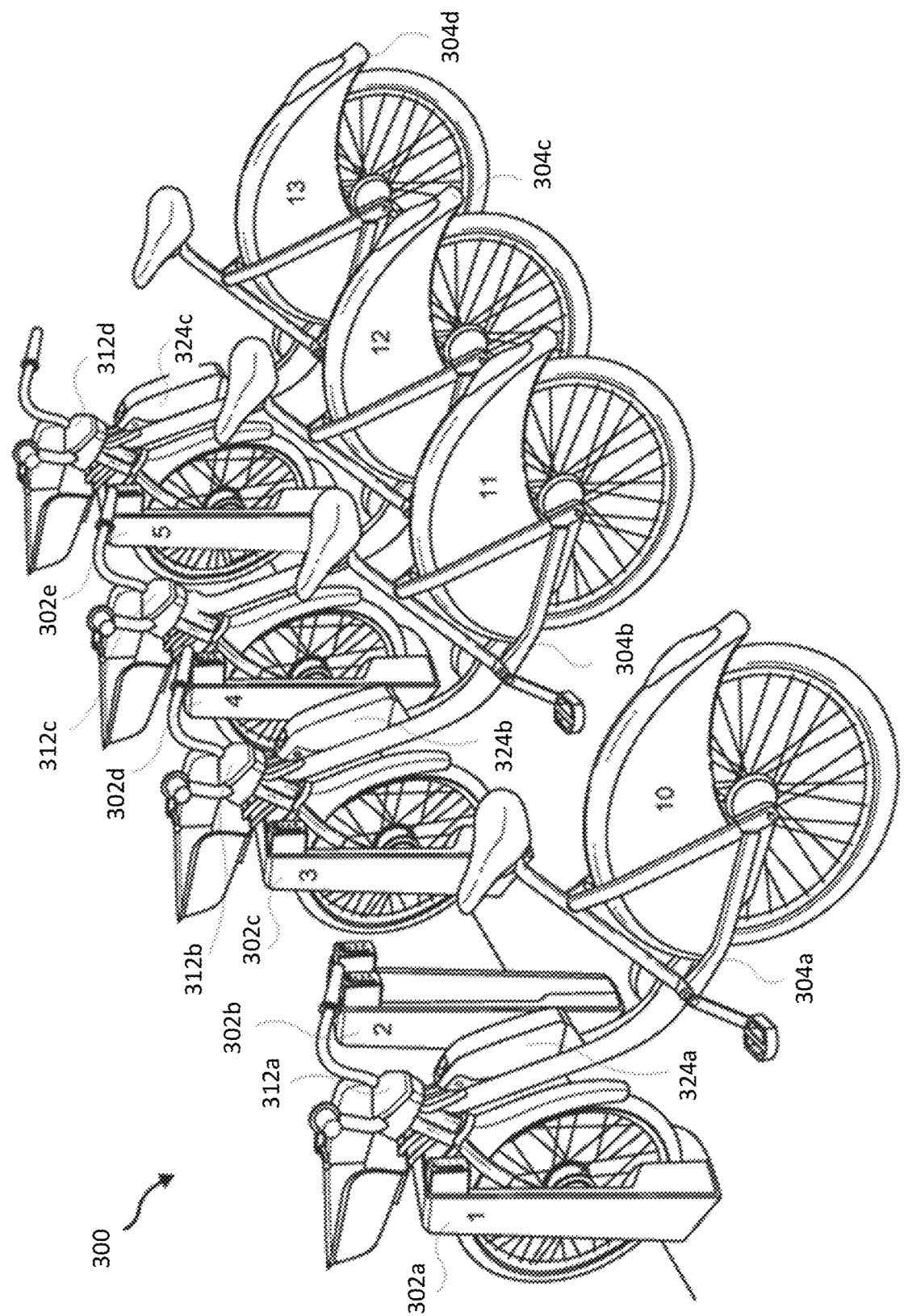

FIG. 3D illustrates a docking station 300 for docking transit vehicles (e.g., transit vehicles 110*c*, 110*e*, and 110*g*, etc.) in accordance with embodiments of the disclosure. As shown in FIG. 3D, docking station 300 may include multiple bicycle docks, such as docks 302*a-e*. For example, a single transit vehicle (e.g., any one of electric bicycles 304*a-d*) may dock in each of docks 302*a-e* of docking station 300. Each of docks 302*a-e* may include a lock mechanism for receiving and locking docking mechanism 140 of electric bicycles 304*a-d*. In some embodiments, once a transit vehicle is docked in a bicycle dock, the dock may be electronically and/or communicatively coupled to the transit vehicle (e.g., to controllers and/or wireless communications modules integrated within cockpit enclosures 312*a-d* of transit vehicles 304*a-d*) via a communication link such that the transit vehicle may be charged by the dock and the transit vehicle and the dock may communicate with each other via the communication link (e.g., similar to communications over mobile mesh network 260), as described herein.

For example, a requestor may use user device 130*a* to reserve, rent, and/or hire a transit vehicle docked to one of bicycle docks 302*a-e* by transmitting a reservation request to management system 240. Once the reservation request is processed, management system 240 may transmit an unlock signal to a docked transit vehicle and/or one of docks 302*a-e* via network 250 and/or mobile mesh network 260. One of docks 302*a-e* may automatically unlock an associated lock mechanism to release the transit vehicle based, at least in part, on such unlock signal. In some embodiments, each of docks 302*a-e* may be configured to charge batteries (e.g., batteries 324*a-c*) of electric bicycles 304*a-d* while electric bicycles 304*a-d* are docked at docks 302*a-e*. In some embodiments, docking station 300 may also be configured to transmit status information associated with docking station 300 (e.g., a number of transit vehicles docked at docking station 300, charge statuses of docked transit vehicles, and/or other fleet status information) to management system 240.

In various embodiments, each of micro-mobility transit vehicles 110*b-d* may be implemented with a subframe assembly configured to receive a modular battery assembly configured to power each one of micro-mobility transit vehicles 110*b-d*. As described herein, such modular battery assembly may include various features designed to ease battery replacement, reduce overall vehicle weight, and provide additional service burden-reducing functionality configured to help form a reliable and robust propulsion system and/or propulsion control system for micro-mobility transit vehicles.

Figure 4:
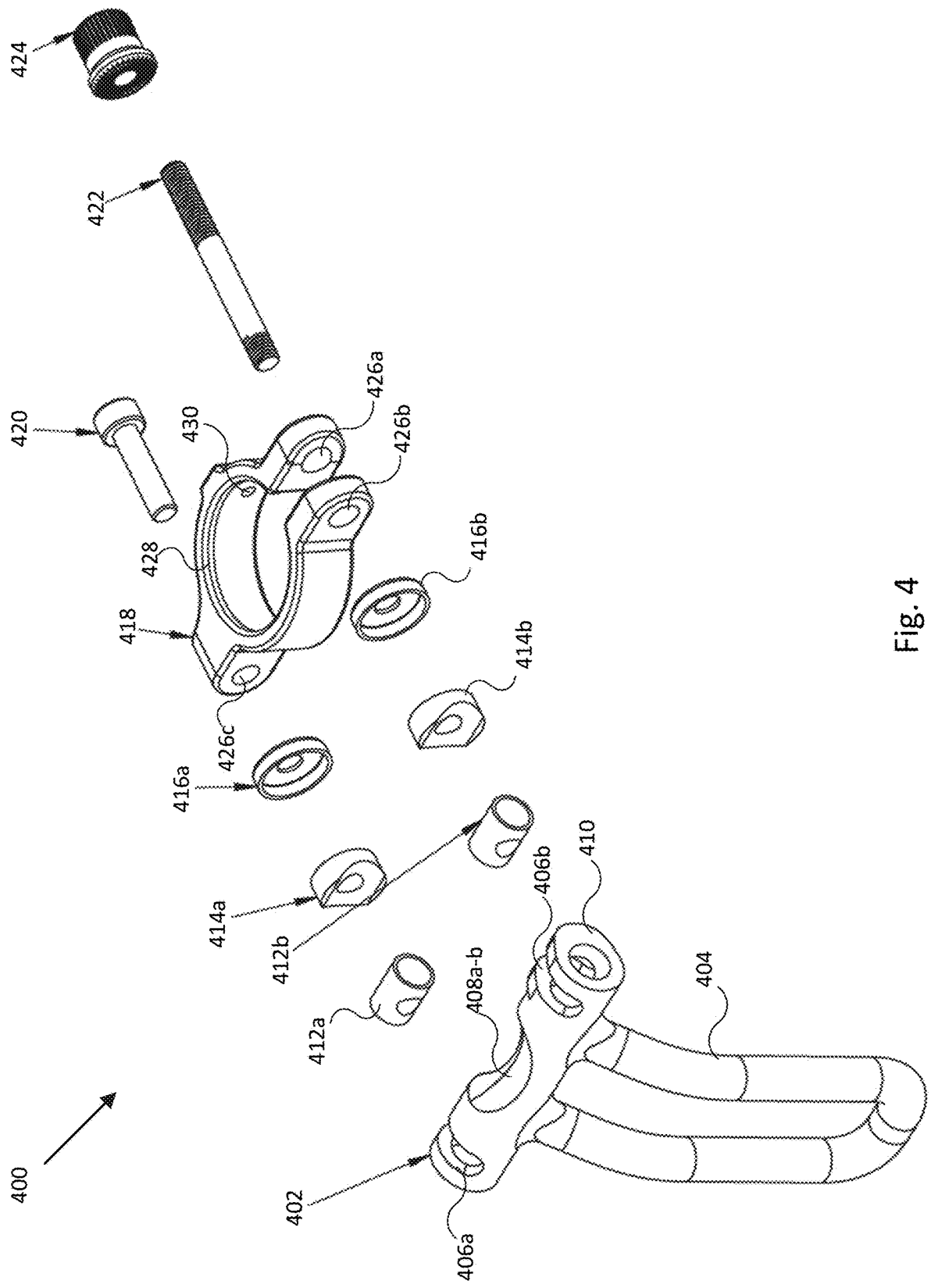
FIG. 4 illustrates an exploded view of a seat post clamp assembly in accordance with an embodiment of the disclosure.

FIG. 4 illustrates an exploded view of a seat post clamp assembly 400 for a micro-mobility transit vehicle in accordance with an embodiment of the disclosure. As shown in FIG. 4, seat post clamp assembly 400 may include adjustment handle 402, axles 412*a* and 412*b*, washers 414*a* and 414*b*, washers 416*a* and 416*b*, seat clamp 418, and fasteners 420, 422, and 424. In an embodiment, adjustment handle 402 may be configured to provide leverage for a transportation requester to easily adjust a seat post. For example, a transportation requester may use their body weight in pressing down the adjustment handle.

In various embodiments, adjustment handle 402 may include a loop 404, fastener slots 406*a* and 406*b*, scalloped notches 408*a-b*, and barrel 410. Loop 404 may have an empty space that provides a place for a hand to grip when adjusting adjustment handle 402. In some implementations, loop 404 may be solid. In an aspect, loop 404 may have grip elements disposed thereon to provide for extra grip as the requester rotates adjustment handle 402. Loop 404 may be configured in different shapes and sizes to provide sufficient leverage in operating seat post clamp assembly. For example, loop 404 may have a bend in its shape. In another example, loop 404 may have a cylindrical shape with ends that attach to barrel 410. In several implementations, loop 404 may be rectangularly shaped. In one or more embodiments, loop 404 may be a color that is different than a color of seat clamp 418 or other components of seat post clamp assembly 400. For example, loop 404 may be a neon color such as neon pink to indicate to a transportation requester that loop 404 is meant to be used to adjust a seat post height.

Fastener slots 406a and 406b may be configured to allow the adjustment handle to freely rotate through an angle of rotation. By non-limiting example, the angle of rotation may be from 0 to 180 degrees in some implementations. Adjustment handle 402 may be rotated about an axis that is parallel or substantially parallel to an axis defined by a line from a point between a middle of a first through-hole 426a and a second through-hole 426b of seat clamp 418 to a point in a middle of a third though-hole 426c of the seat clamp. For example, adjustment handle 402 may be rotated about a center of barrel 410.

Scalloped notches 408a-b may be configured to allow adjustment handle 402 to rotate about the axis without physical limitation from direct contact with seat clamp 418. For example, as the adjustment handle 402 is rotated, there may be a space between an outer surface of seat clamp 418 and surfaces of scalloped notches 408a-b. In this regard, the shape of scalloped notches 408a-b may be configured to outline the outer surface of seat clamp 418.

According to some embodiments, fastener 422 may be inserted through first through-hole 426a, second through-hole 426b, washer 416b, washer 414b, and fastener slot 406b. Fastener 422 may be a bolt (e.g., threaded bolt, end bolt, etc.) in some implementations.

Axle 412b may be disposed inside barrel 410 and configured to receive fastener 422. For example, an interior of axle 412b may be threaded to receive a threaded portion of fastener 422. Axle 412b may be cylindrical in shape and configured inside of barrel 410 such that barrel 410 may rotate as a sleeve around axle 412b as adjustment handle 402 is adjusted/rotated. Thus, an inner portion of barrel 410 may be a cylindrically hollow space to facilitate rotation of barrel 410 as a sleeve around axle 412b.

According to some embodiments, fastener 420 may be inserted through third through-hole 426a, washer 416a, washer 414a, and fastener slot 406a. Fastener 420 may be a bolt (e.g., threaded bolt, etc.) in some implementations.

Axle 412a may be disposed inside barrel 410 and configured to receive fastener 420. For example, an interior of axle 412a may be threaded to receive a threaded portion of fastener 420. Axle 412a may be cylindrical in shape and configured inside barrel 410 to facilitate rotation of adjustment handle 402 without substantial hindrance. In this regard, barrel 410 may rotate around axle 412a as a sleeve as adjustment handle 402 is rotated to make seat post height adjustments. An inner portion of barrel 410 may be a cylindrically hollow space to facilitate rotation of adjustment handle 204 while axle 412b is disposed therein. In some embodiments, the inner portion of barrel 410 where axle 412b is disposed and the inner portion of barrel 410 where axle 412a is disposed may be separated by a solid inner portion of barrel 410. In some implementations, each inner portion of barrel 410 may have tolerances that allow for enclosure of a axles 412a and 412b to keep adjustment handle 402 fastened as a component of seat post clamp assembly 400 while also allowing for sufficient rotational movement of adjustment handle 402 with limited free play.

In several embodiments, washers 416a and 416b may be cup washers or conical washers configured to receive washers 414a and 414b as well as hold washers 414a and 414b in place. In some embodiments, washers 414a and 414 may be made of various durable materials including, for example, Acetal (e.g., POM). Acetal is a very high strength, low friction engineered plastic exhibiting excellent wear resistance in both wet and dry environments. In some embodiments, washers 414a and 414b may be configured to include a curved surface to facilitate rotation of barrel 410. When adjustment handle 402 is in a closed position, the curved surface of washers 414a and 414b may receive a greater force at a point of contact with barrel 410 than when adjustment handle 402 is in an open position. In this regard, barrel 410 may have a shape that facilitates application of more or less force to washers 414a and 414b as barrel 410 rotates as adjustment handle 402 is rotated between the open position and closed position.

In some embodiments, adjustment handle 402, seat clamp 418, washers 416a and 416b, and fastener 424 may be made of various durable materials including, for example, an aluminum alloy (e.g., AL 6061-T6). In some embodiments, axles 412a and 412b, and fasteners 420 and 422 may be made of various durable materials, for example, stainless steel (e.g., SUS 302). Stainless steel provides useful resistance to corrosion.

In various embodiments, fastener 424 may be configured to secure fastener 422. For example, fastener 424 may be a threaded adjustment nut. In various embodiments, one or more components of seat post clamp assembly 400 may be omitted. For example, washers 416a and 416b and washers 414a and 414b may be omitted in one or more embodiments.

According to some embodiments, seat post clamp assembly 400 may be installed on a transit vehicle. For example, seat clamp 418 may be mounted on a seat post tube of the transit vehicle by placing seat clamp 418 on an end of the seat post tube such that lip 428 (e.g., edge, ridge, etc.) stops at the end of the seat post tube. Lip 428 may prevent seat post clamp assembly 400 from sliding down the seat post tube, such as when the seat clamp 418 is loosened. In some cases, a set screw or other fastener may be provided through through-hole 430 and into the seat post tube to fasten the seat post clamp assembly to the seat post tube and prevent the seat post clamp assembly from rotating about the seat post tube.

Figure 5A:
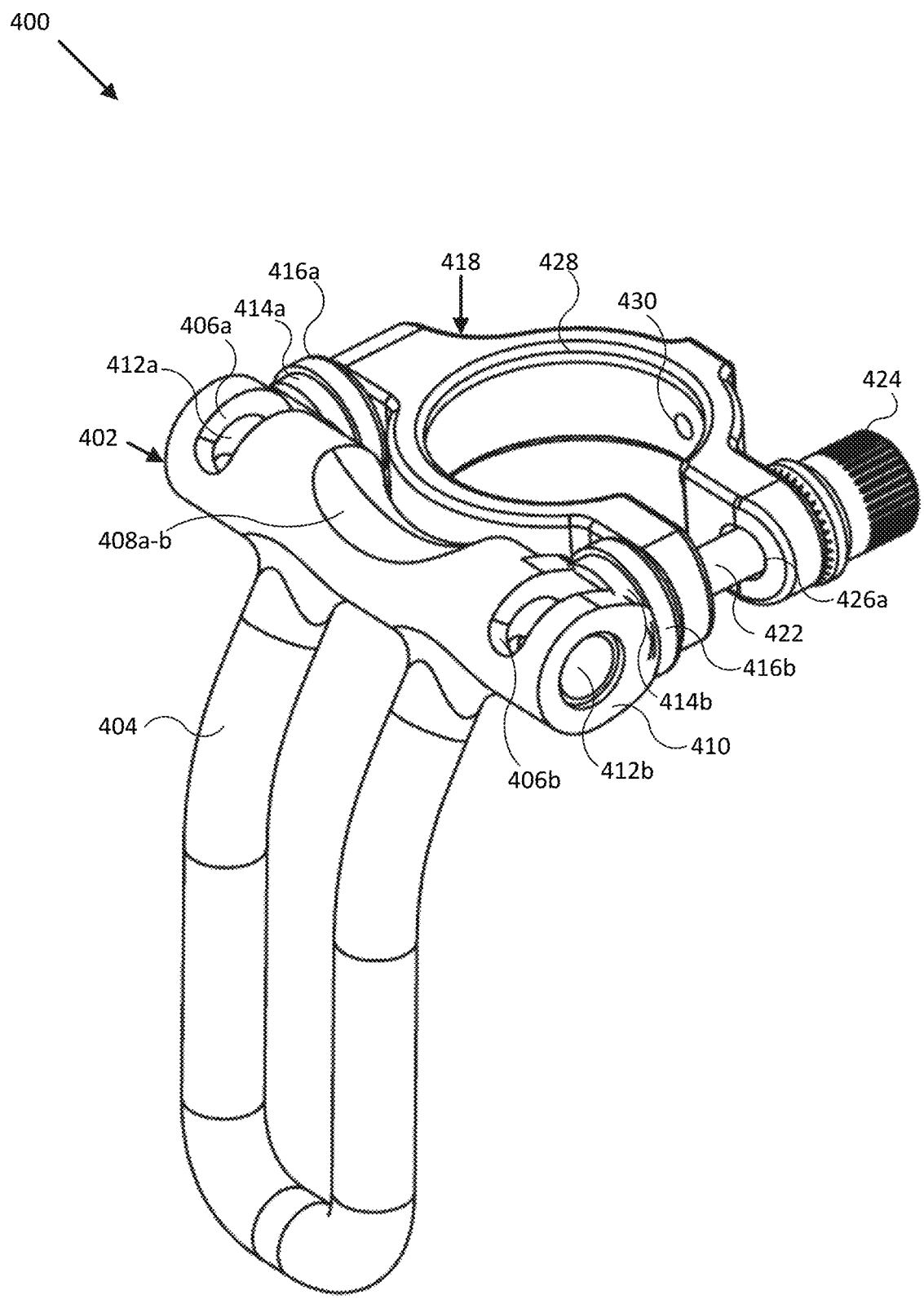
FIGS. 5A-5H illustrate perspective views of a seat post clamp assembly in accordance with an embodiment of the disclosure.
Figure 5B:
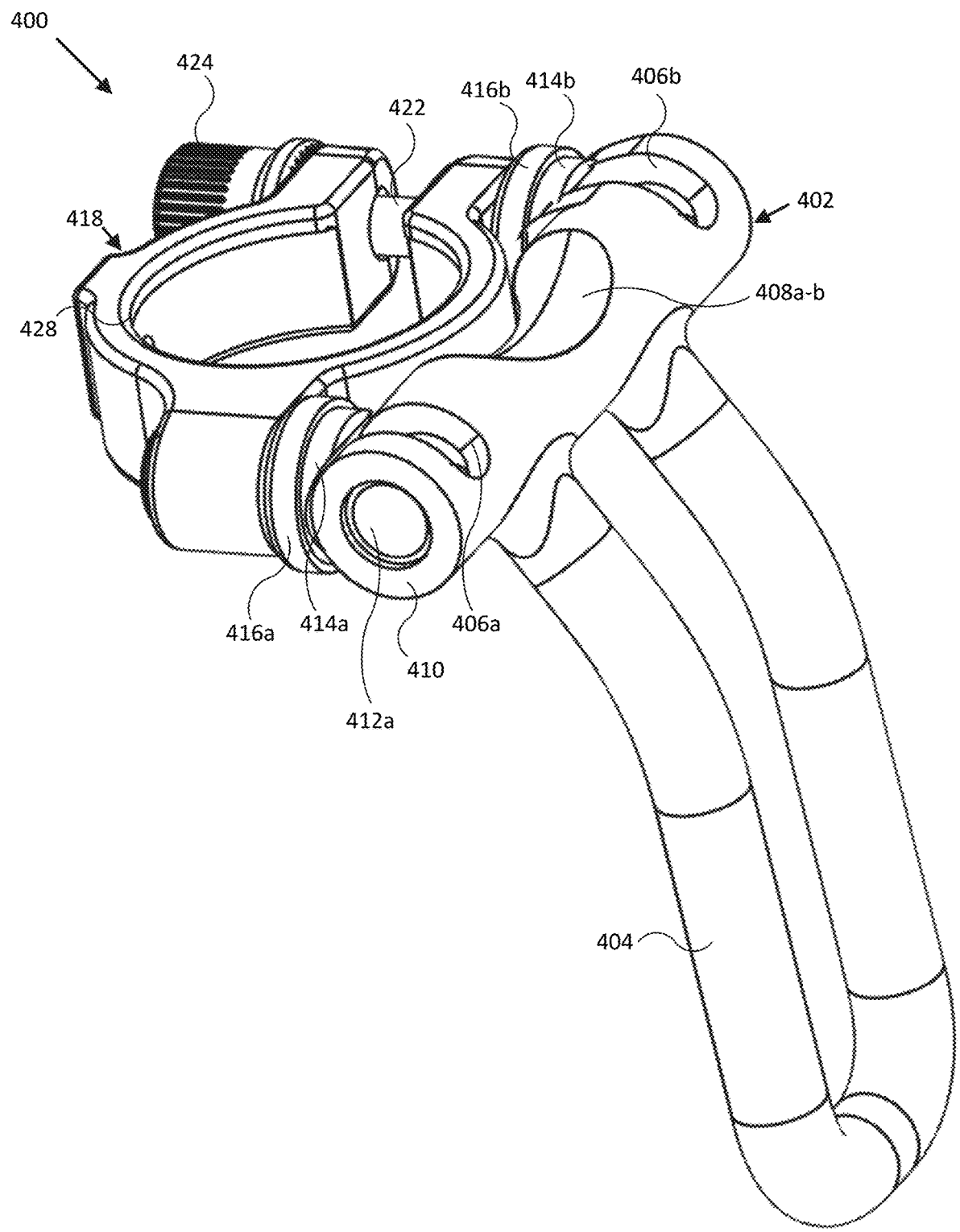
Figure 5C:
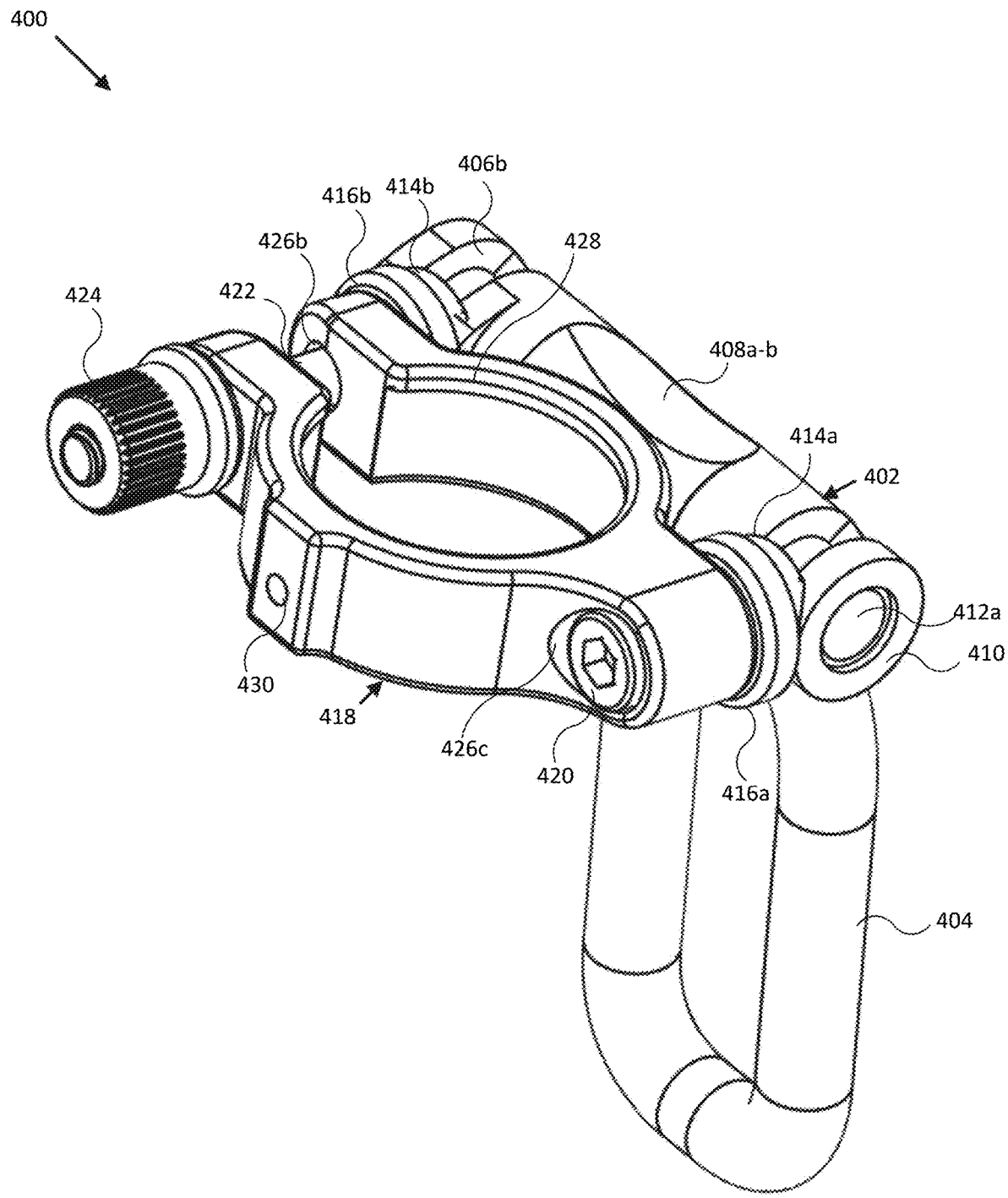
Figure 5D:
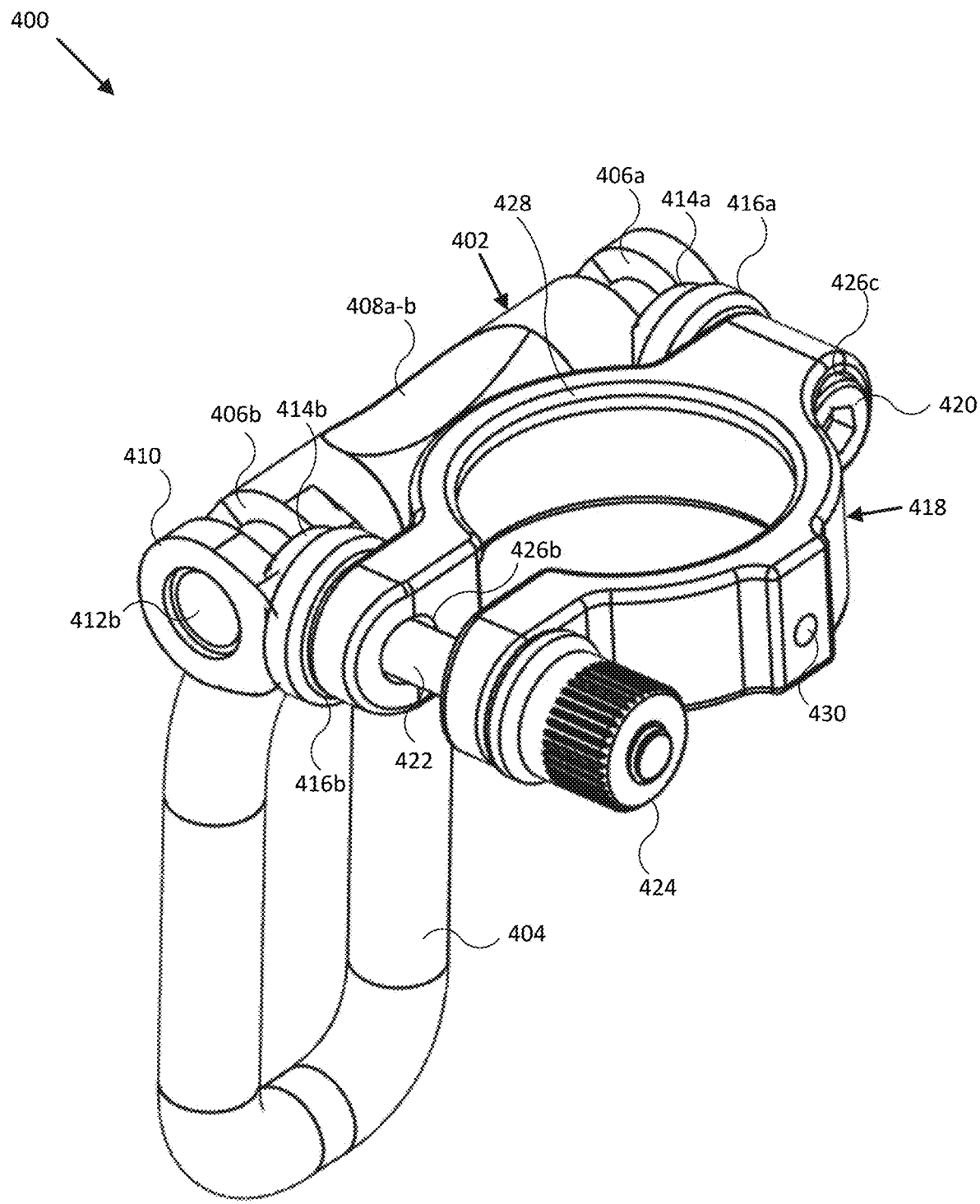
Figure 5E:
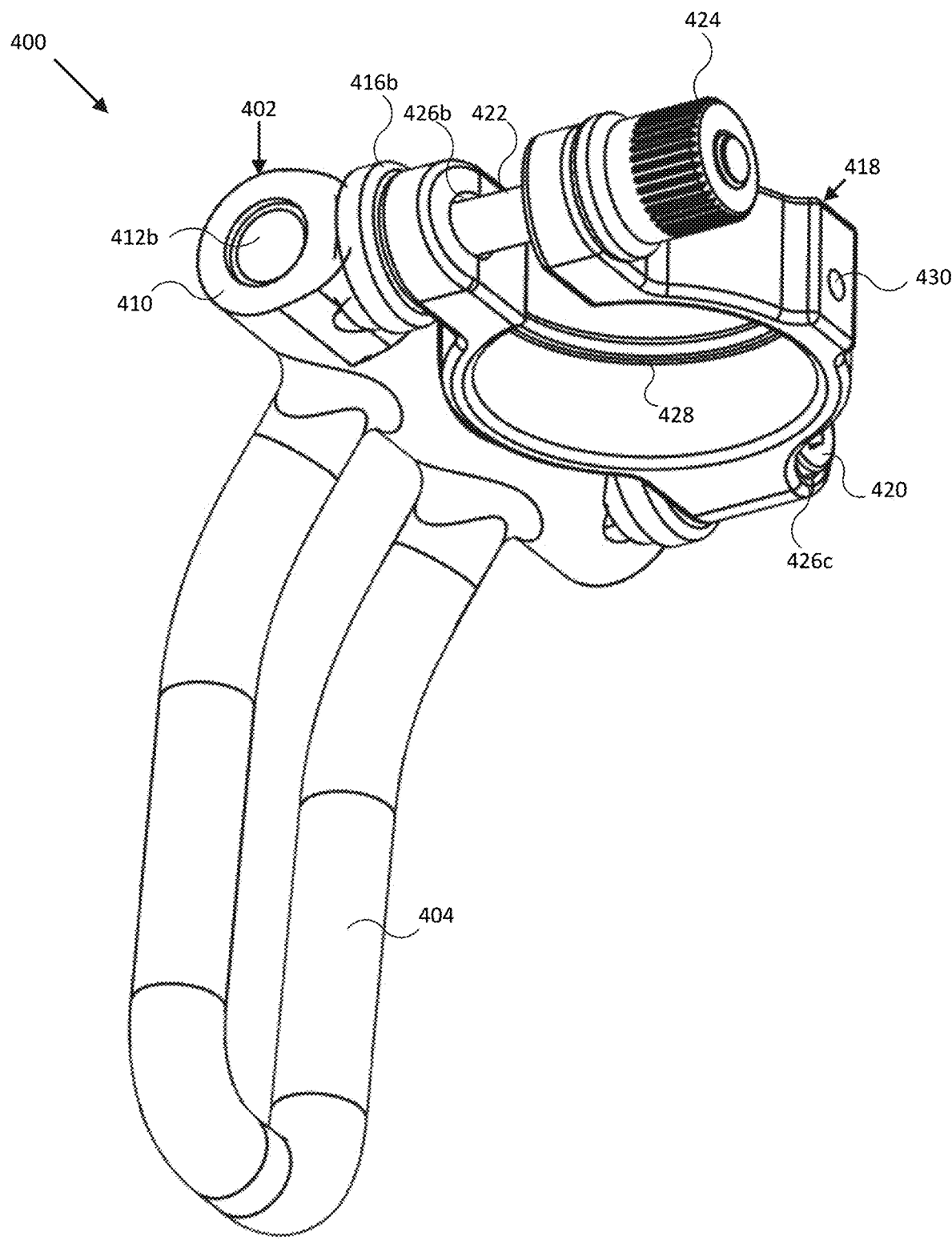
Figure 5F:
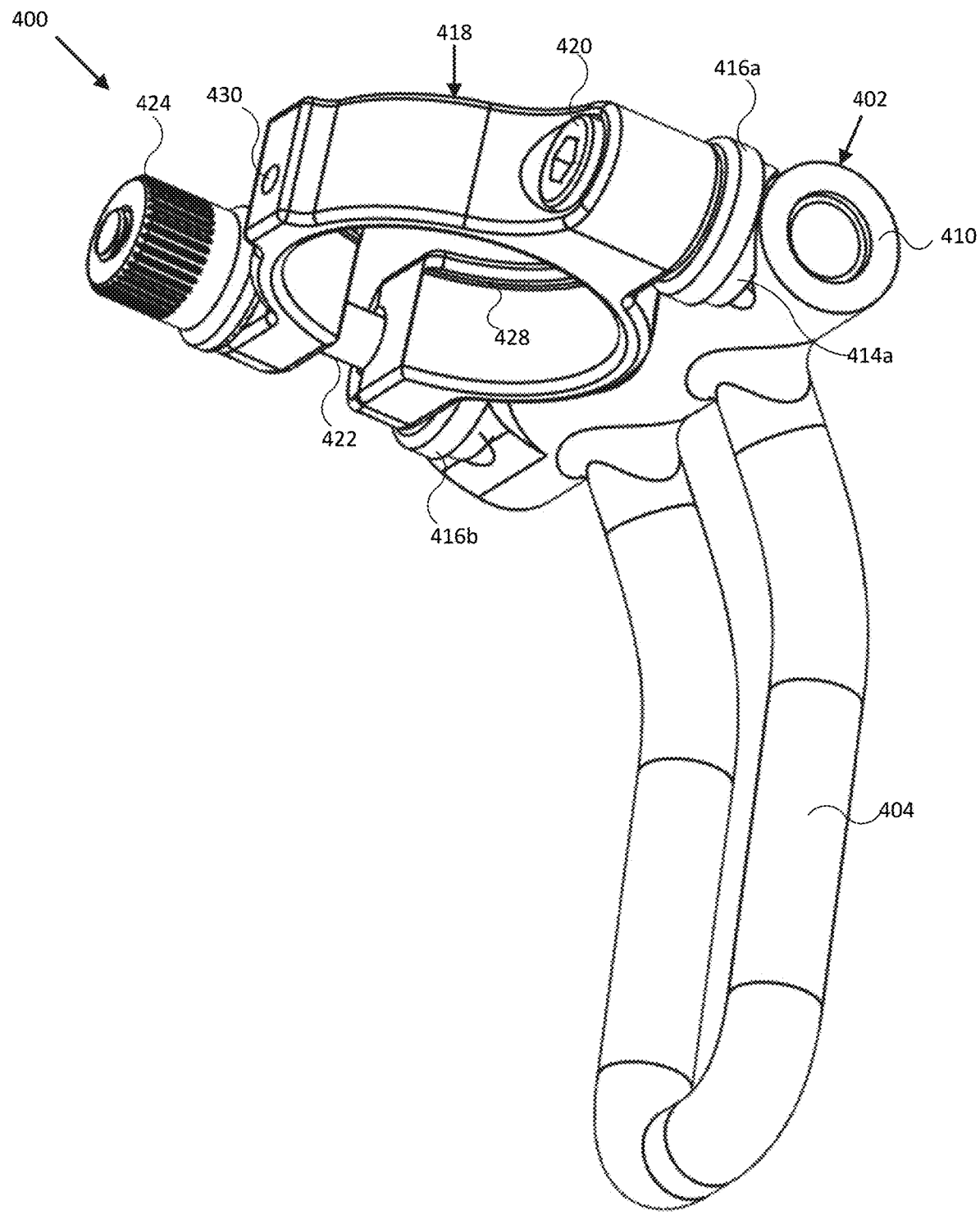
Figure 5G:
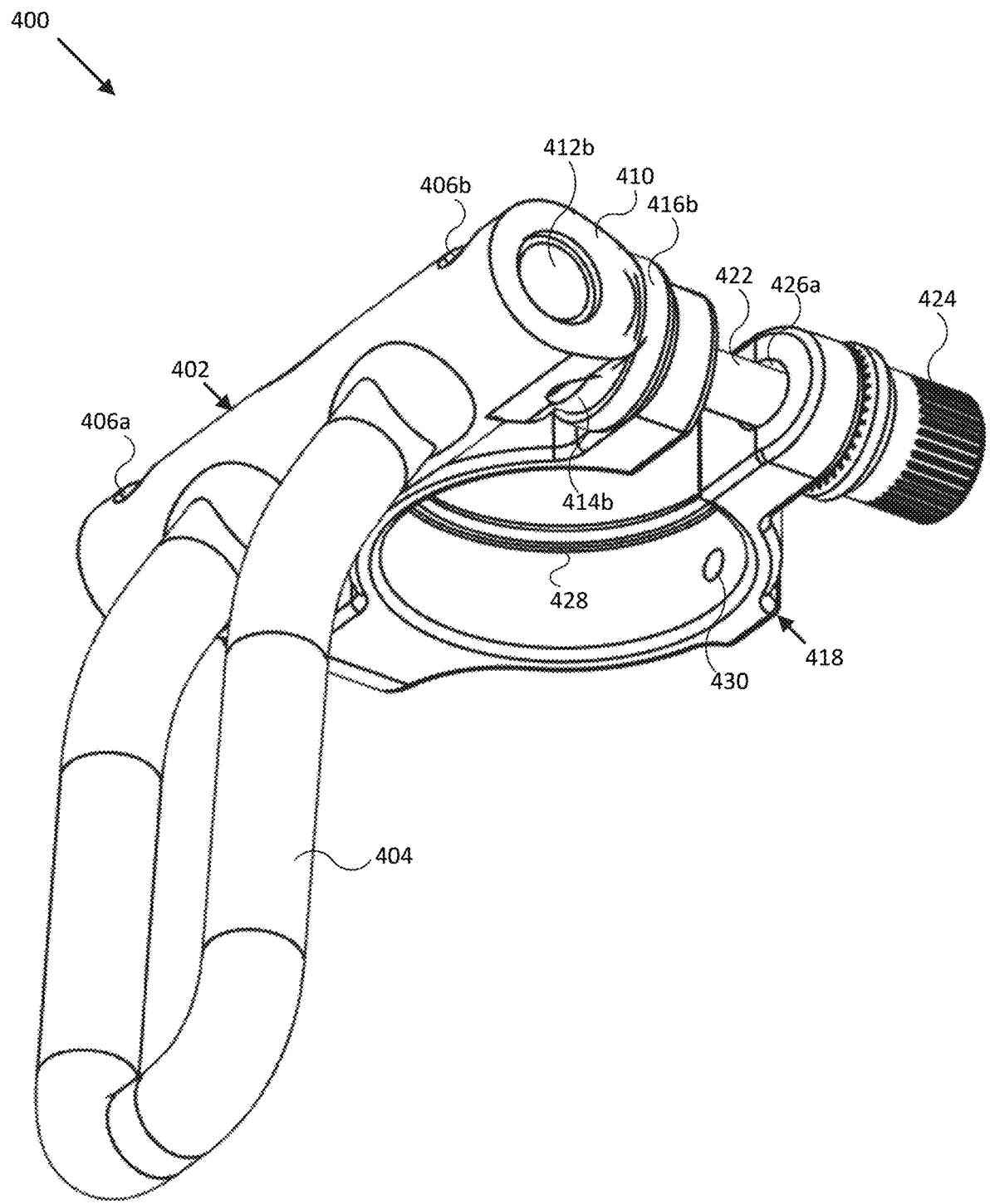
Figure 5H:
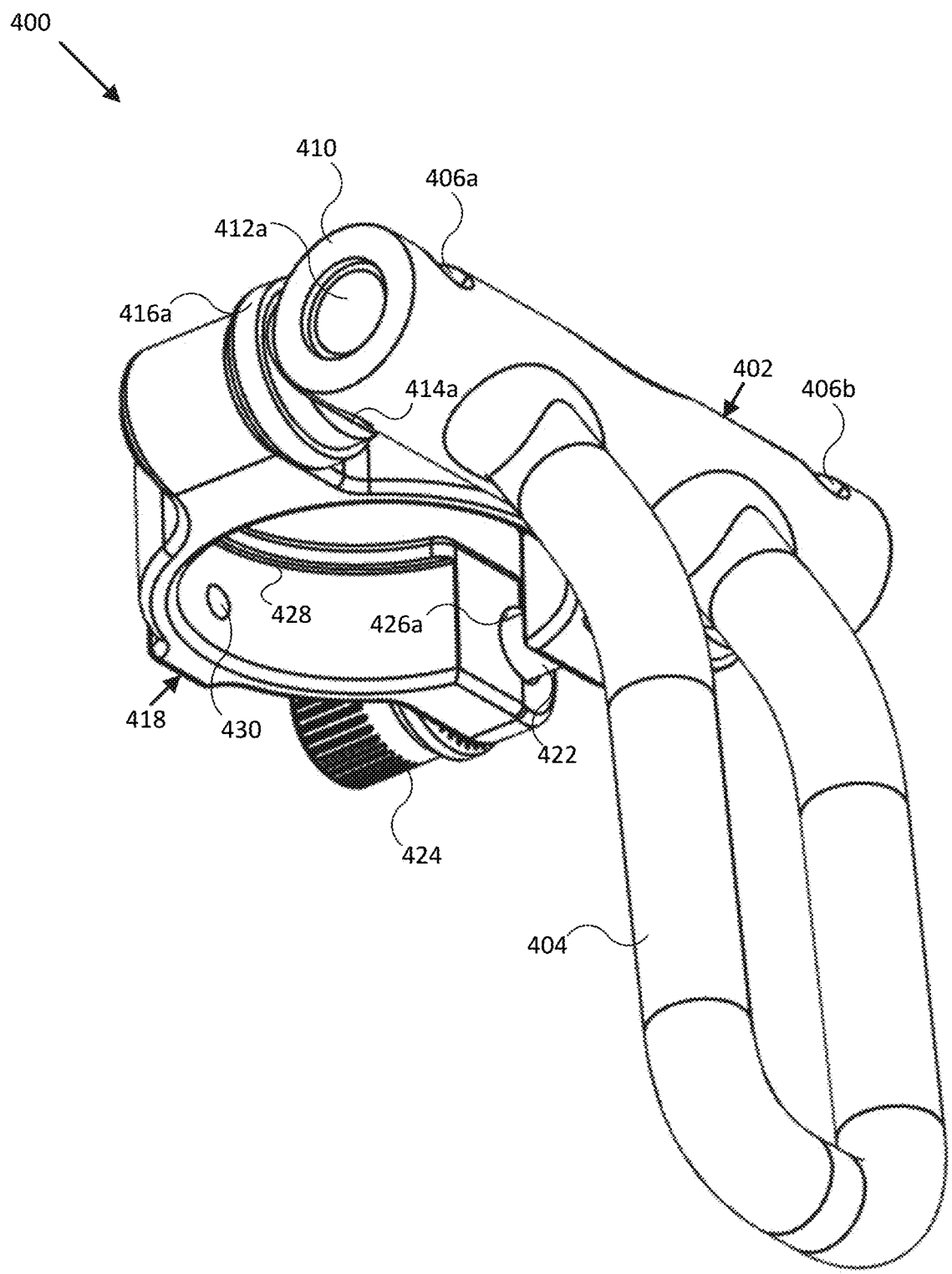

FIGS. 5A-5H illustrate various view of the seat post clamp assembly 400. Specifically, FIG. 5A illustrates a front right top perspective view of seat post clamp assembly 400 in accordance with embodiments of the disclosure. FIG. 5B illustrates a front left top perspective view of seat post clamp assembly 400 in accordance with embodiments of the disclosure. FIG. 5C illustrates a rear left top perspective view of seat post clamp assembly 400 in accordance with embodiments of the disclosure. FIG. 5D illustrates a rear right top perspective view of seat post clamp assembly 400 in accordance with embodiments of the disclosure. FIG. 5E illustrates a rear right bottom perspective view of seat post clamp assembly 400 in accordance with embodiments of the disclosure. FIG. 5F illustrates a rear left bottom perspective view of seat post clamp assembly 400 in accordance with embodiments of the disclosure. FIG. 5G illustrates a front right bottom perspective view of seat post clamp assembly 400 in accordance with embodiments of the disclosure. FIG. 5H illustrates a front left bottom perspective view of seat post clamp assembly 400 in accordance with embodiments of the disclosure.

Figure 6A:
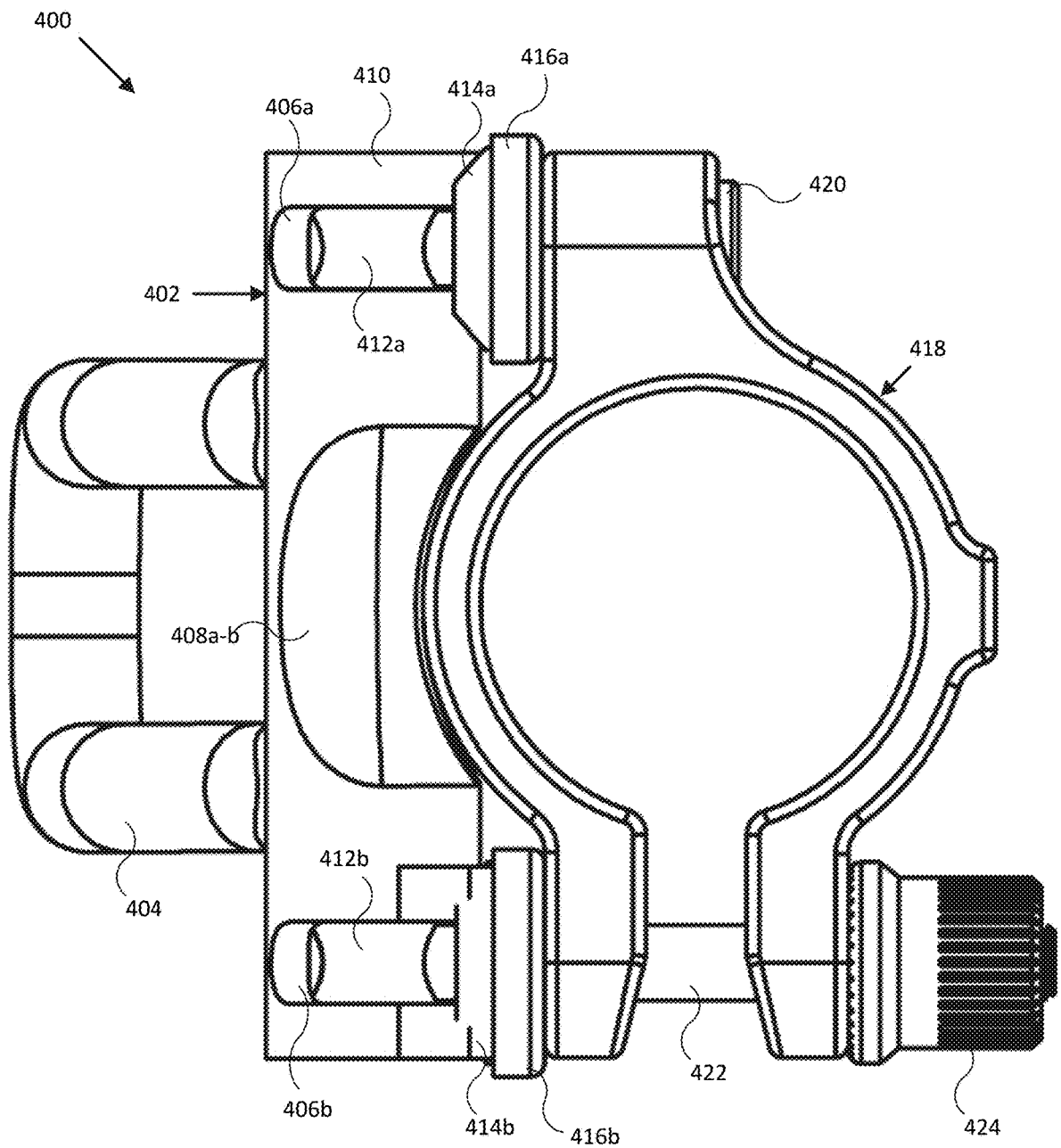
FIG. 6A illustrates a top view of a seat post clamp assembly in accordance with an embodiment of the disclosure.
Figure 6B:
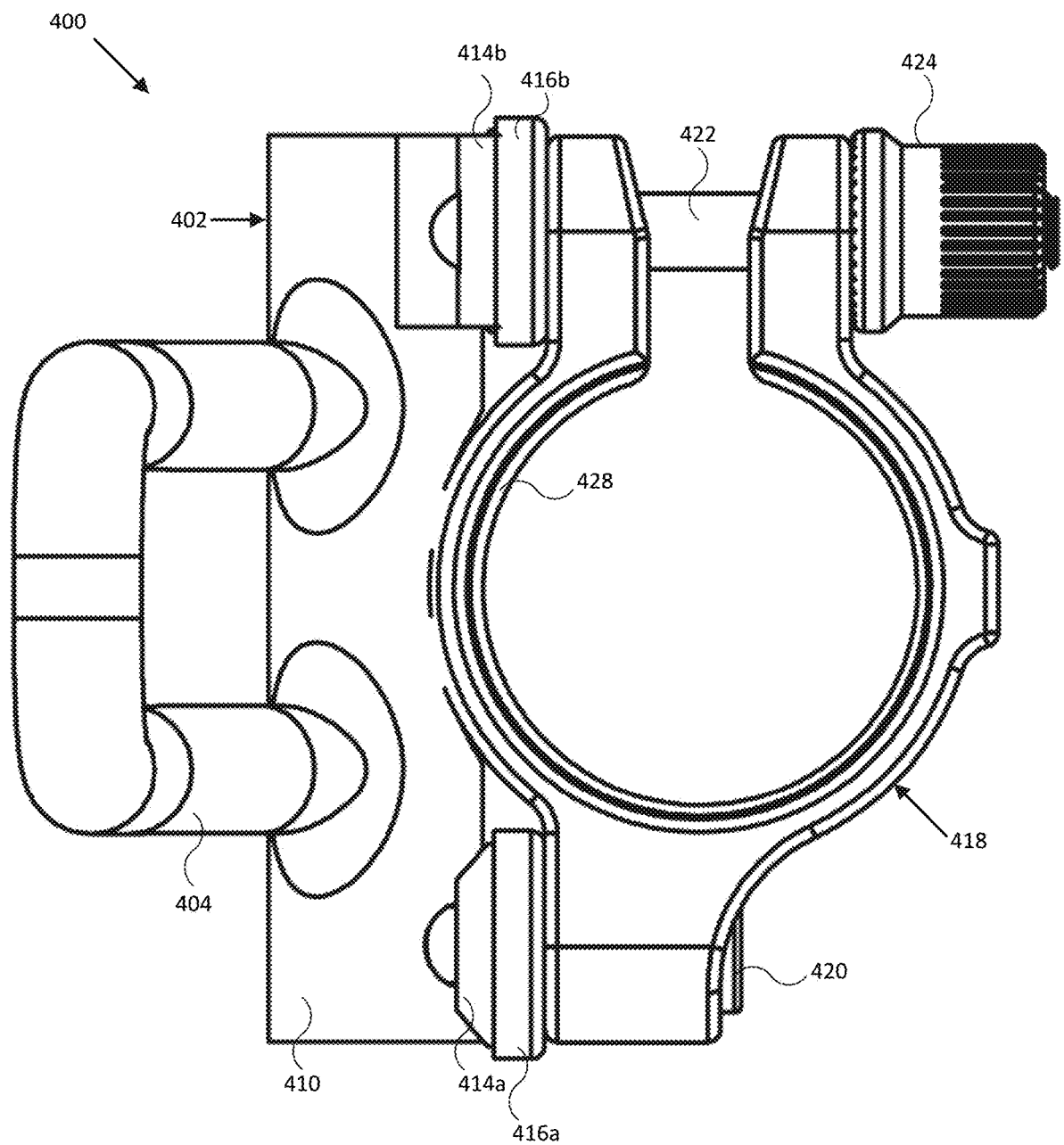
FIG. 6B illustrates a bottom view of a seat post clamp assembly in accordance with an embodiment of the disclosure.
Figure 6C:
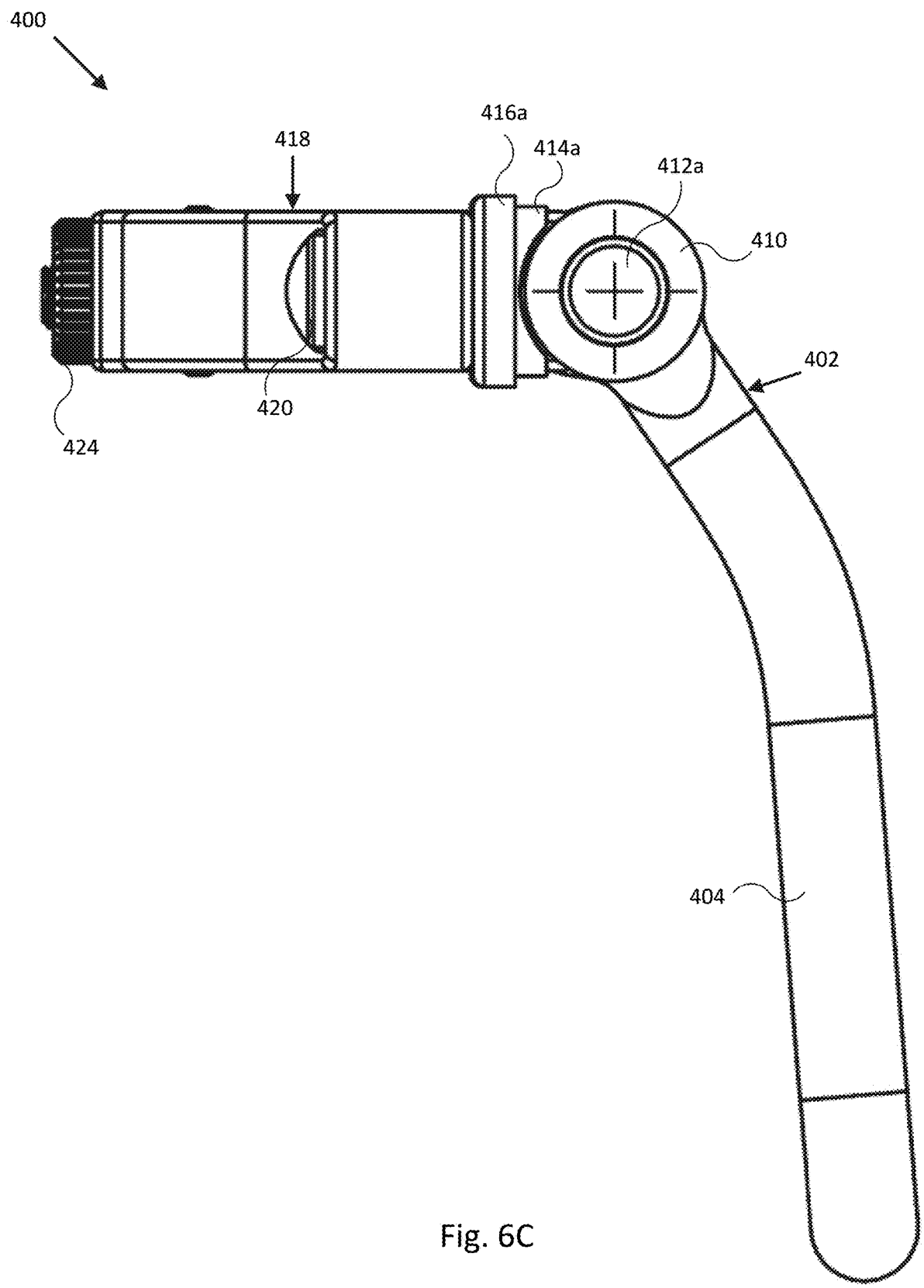
FIGS. 6C-6F illustrate side views of a seat post clamp assembly in accordance with embodiments of the disclosure.
Figure 6D:
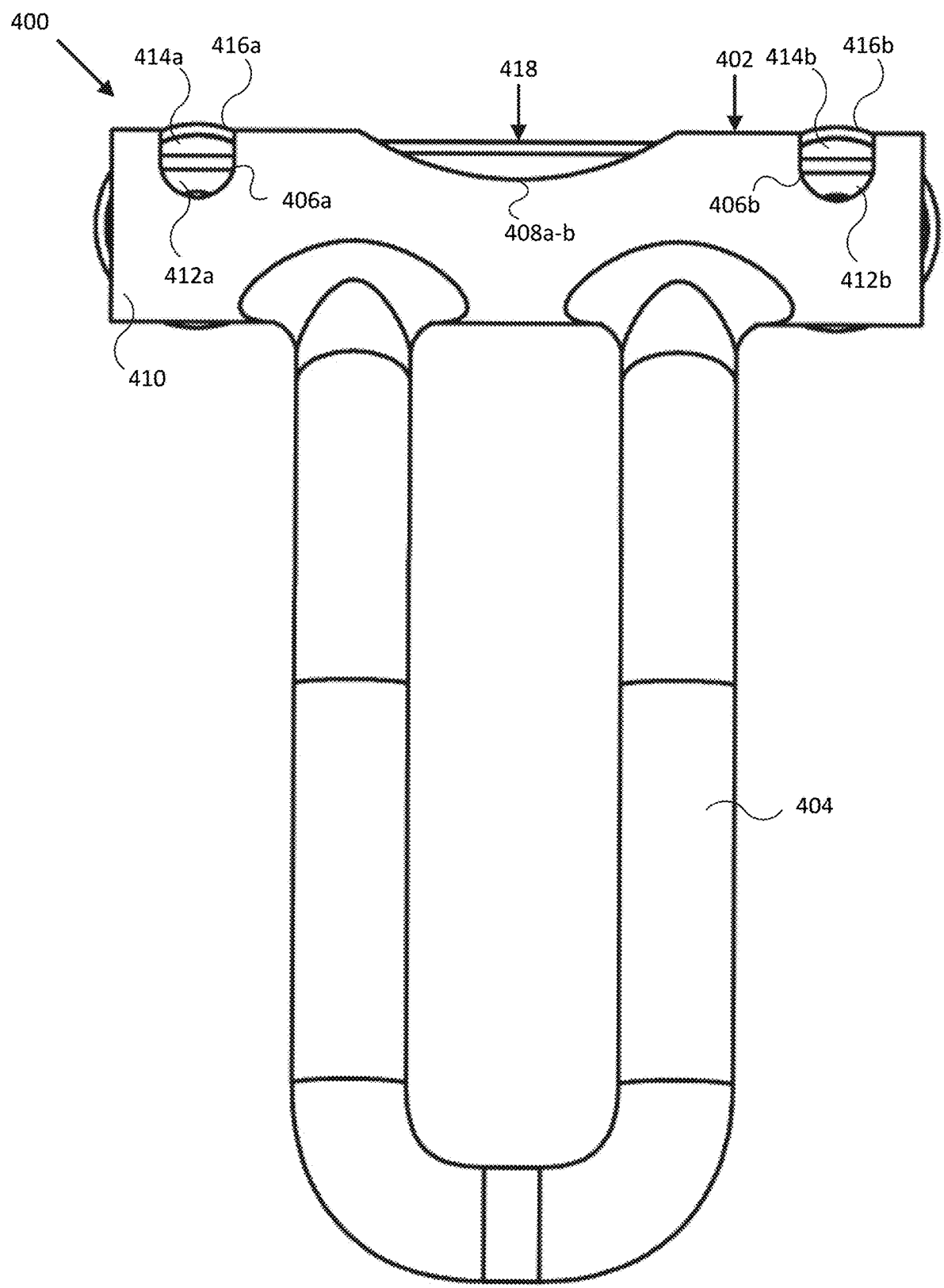
Figure 6E:
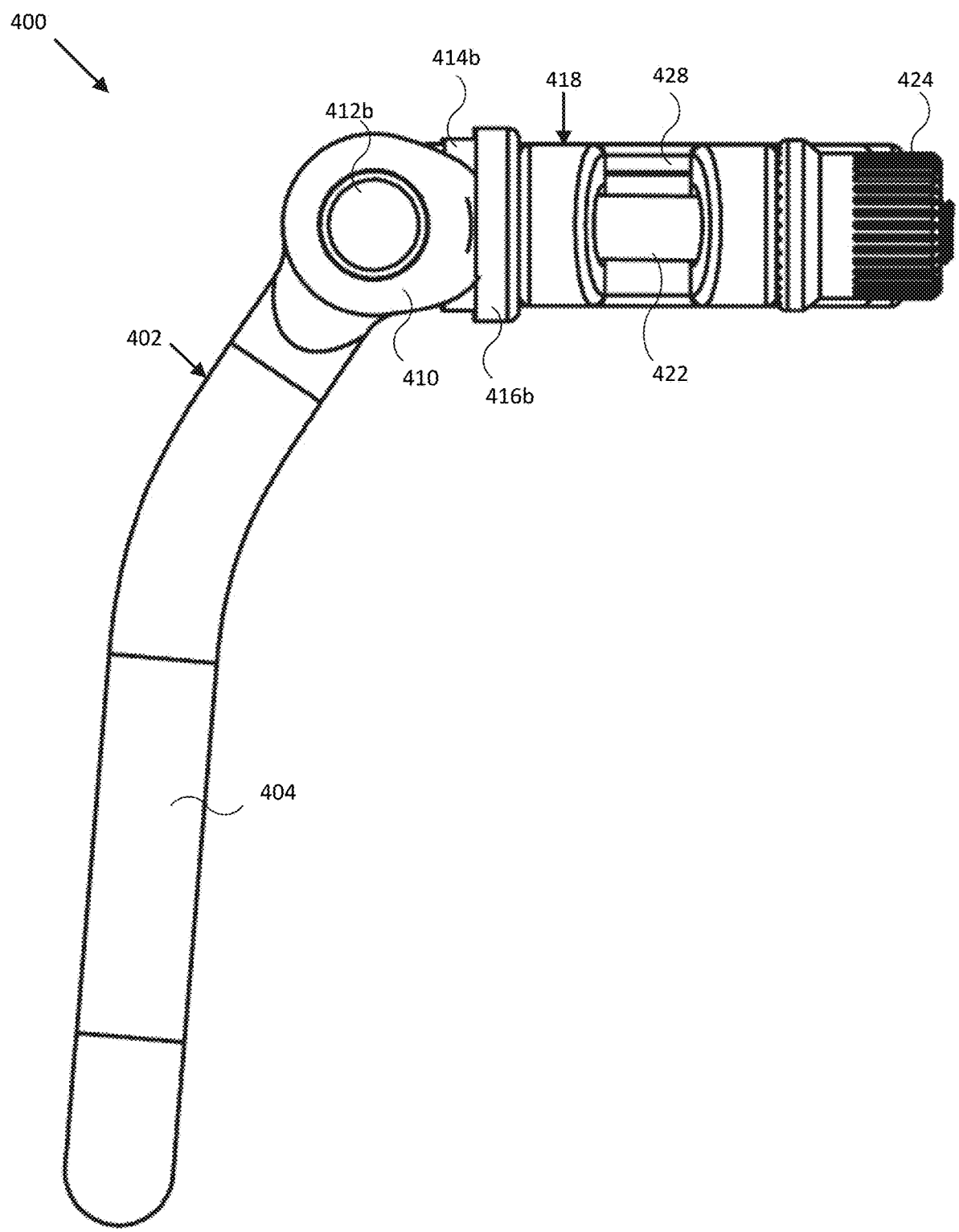
Figure 6F:
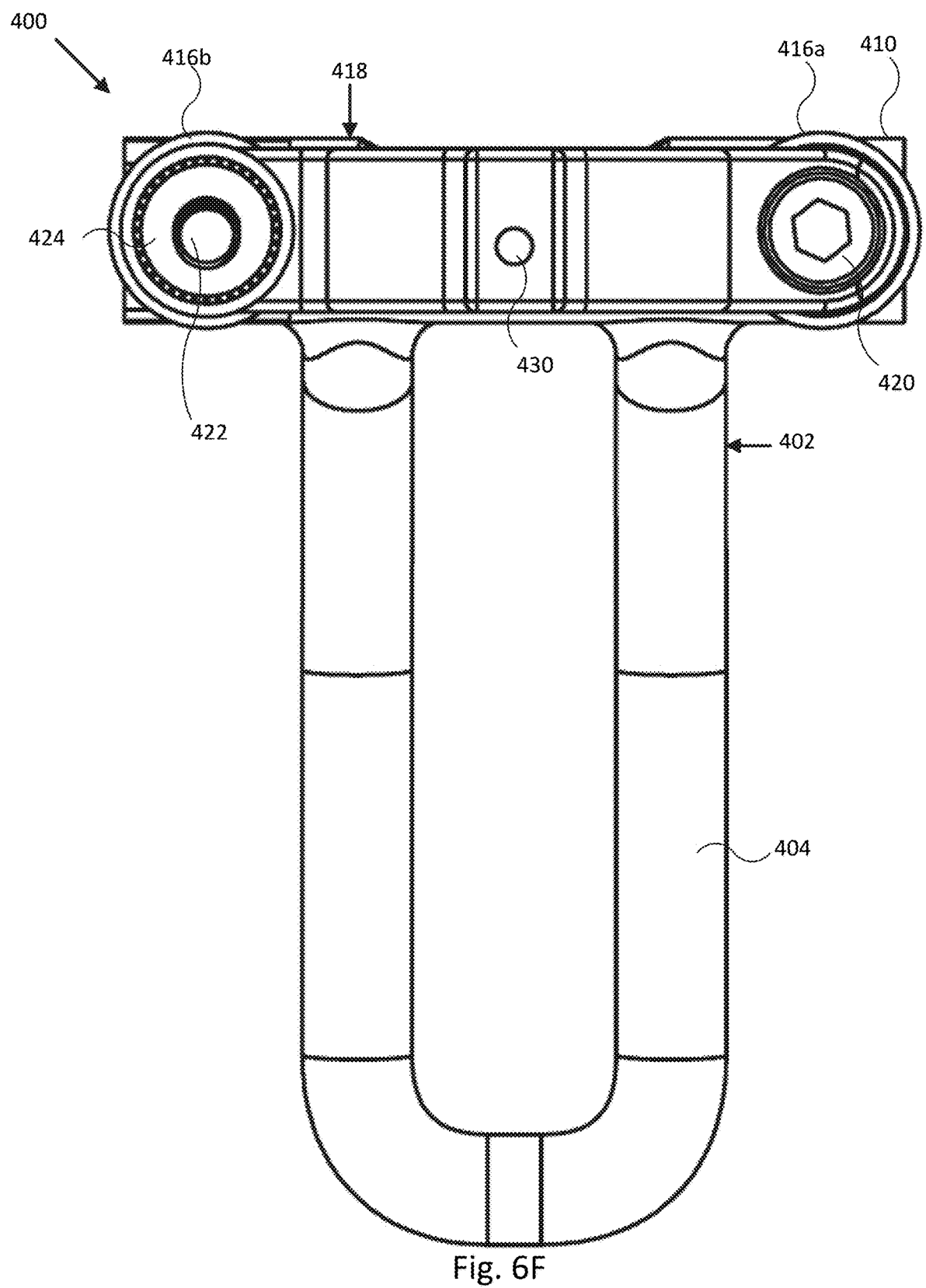
Figure 7:
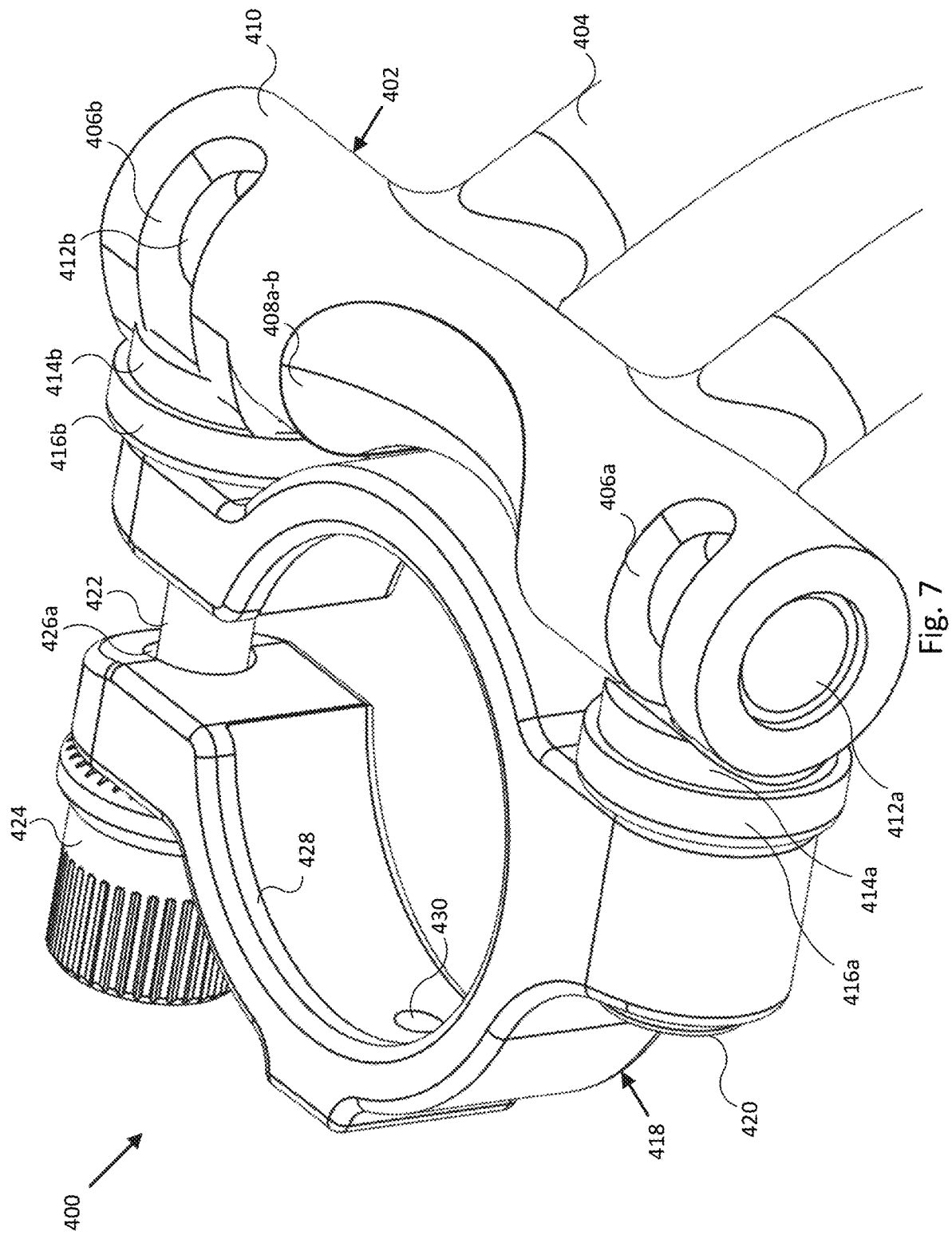
FIG. 7 illustrates a magnified perspective view of a seat post clamp assembly in accordance with embodiments of the disclosure.

Various additional views of seat post clamp assembly 400 are illustrated in FIGS. 6A-7. Specifically, FIG. 6A illustrates a top view of seat post clamp assembly 400 in accordance with embodiments of the disclosure. FIG. 6B illustrates a bottom view of seat post clamp assembly 400 in accordance with embodiments of the disclosure. FIG. 6C illustrates a left view of seat post clamp assembly 400 in accordance with embodiments of the disclosure. FIG. 6D illustrates a front view of seat post clamp assembly 400 in accordance with embodiments of the disclosure. FIG. 6E illustrates a right view of seat post clamp assembly 400 in accordance with embodiments of the disclosure. FIG. 6F illustrates a rear view of seat post clamp assembly 400 in accordance with embodiments of the disclosure. FIG. 7 illustrates a magnified perspective view of seat post clamp assembly 400 in accordance with embodiments of the disclosure.

Figure 8A:
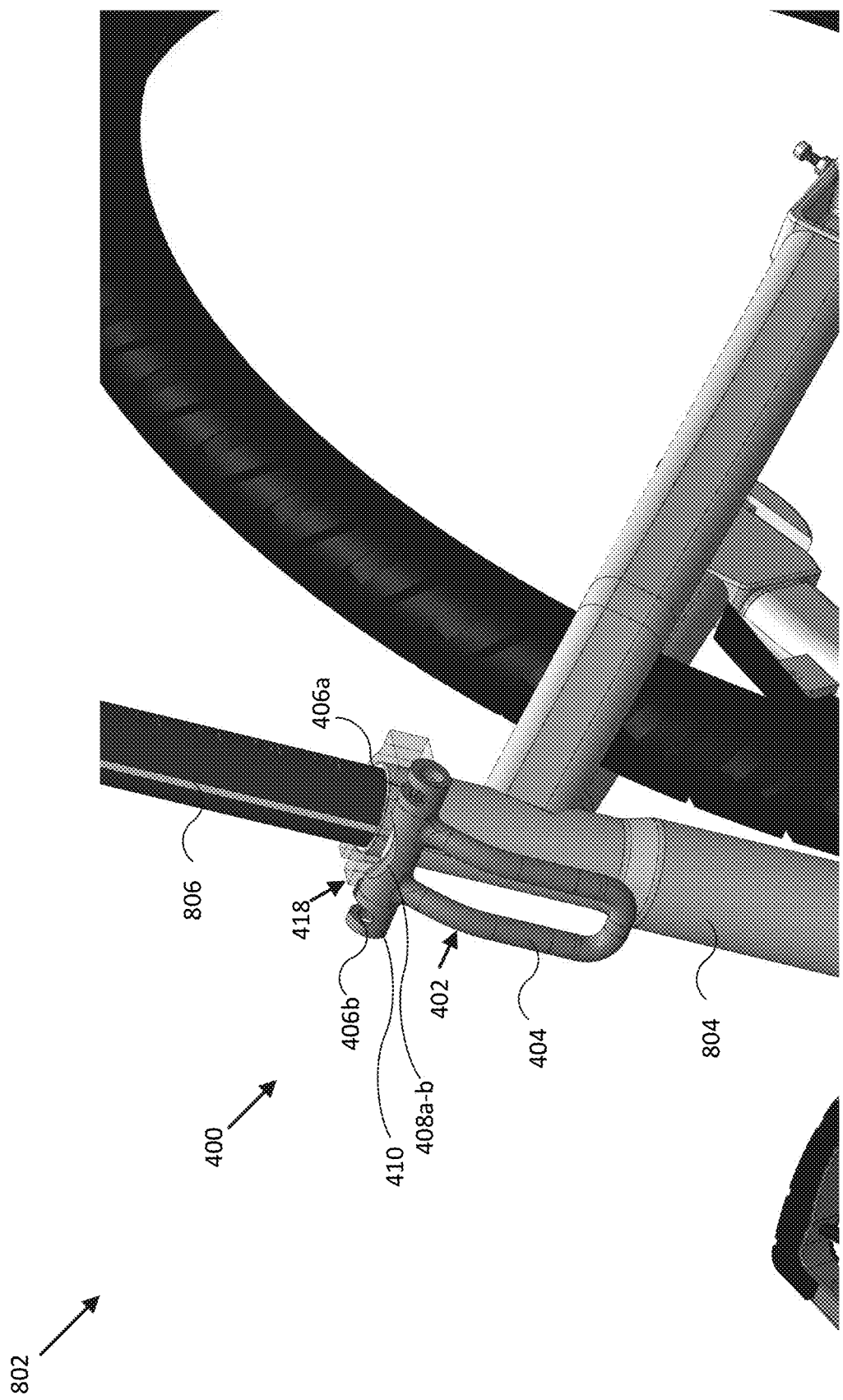
FIG. 8A illustrates a perspective view of a seat post clamp assembly attached to a seat post tube of a transit vehicle in accordance with embodiments of the disclosure.

FIG. 8A illustrates a perspective view of a seat post clamp assembly 801 installed on a transit vehicle 802 where an adjustment handle 402 of the seat post clamp assembly 801 is in a closed position in accordance with embodiments of the disclosure. Seat post clamp assembly 801 may be installed on seat post tube 804 of transit vehicle 802. Seat post 806 may extend and telescope from an inner portion of seat post tube 804.

Figure 8B:
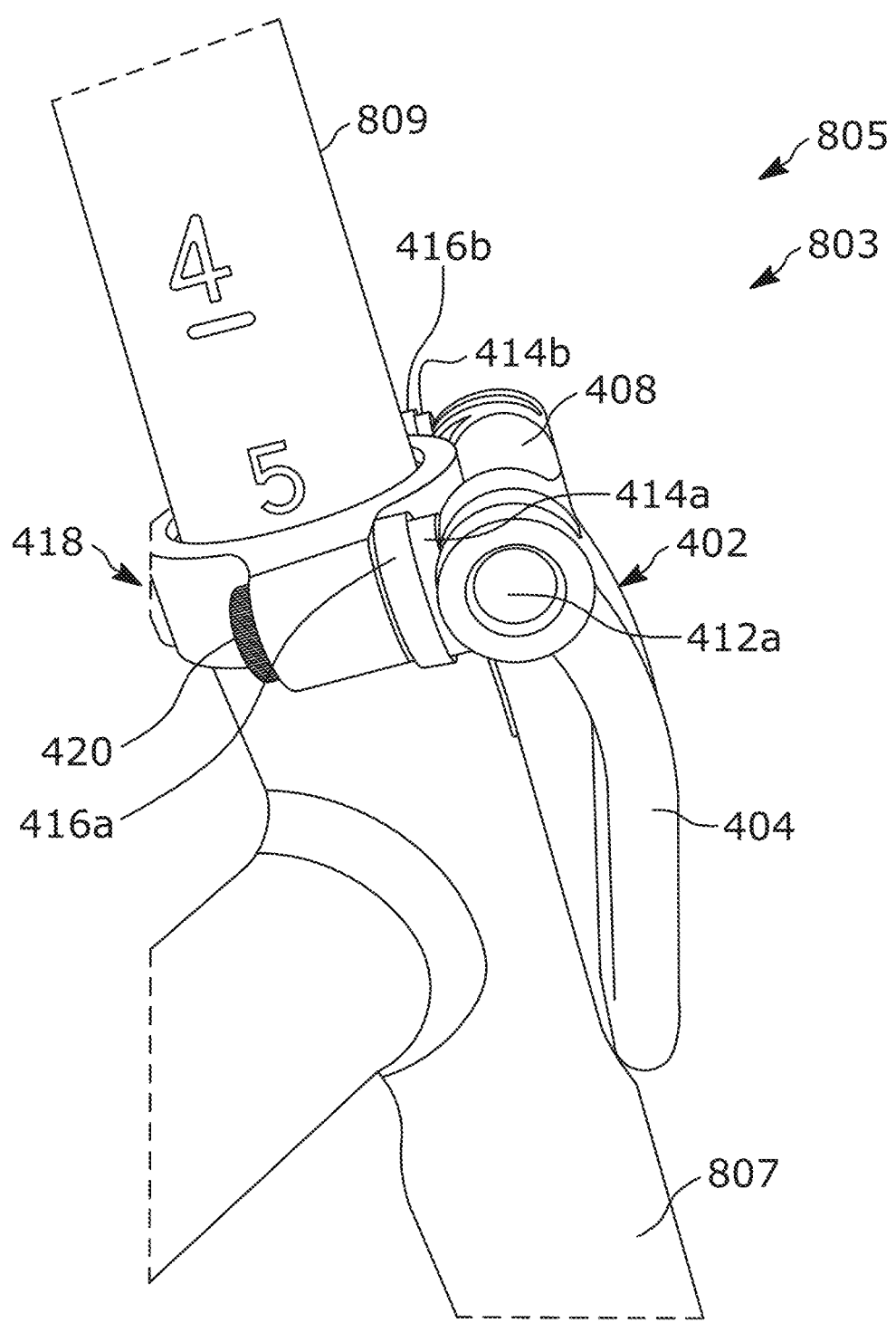
FIGS. 8B-8C illustrate perspective views of a seat post clamp assembly attached to a seat post tube of a transit vehicle in accordance with embodiments of the disclosure.

FIG. 8B illustrates a left perspective view of a seat post clamp assembly 803 installed on a transit vehicle 805 where an adjustment handle 402 of seat post clamp assembly 803 is in a closed position in accordance with embodiments of the disclosure. Seat post clamp assembly 803 may be installed on seat post tube 807 of transit vehicle 805. Seat post 809 may extend and telescope from an inner portion of seat post tube 807.

Figure 8C:
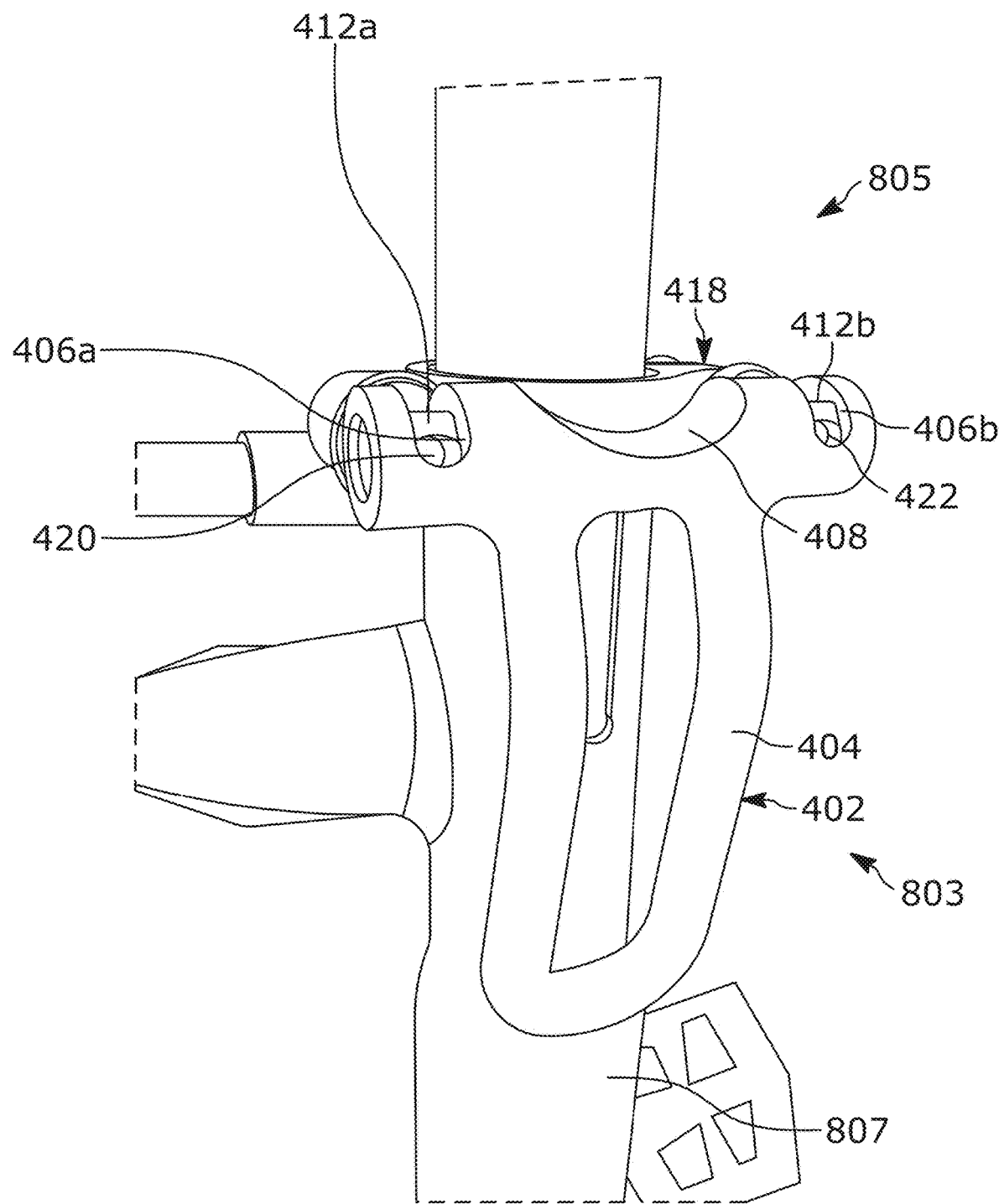

FIG. 8C illustrates a front perspective view of seat post clamp assembly 803 of FIG. 8B.

Figure 9:
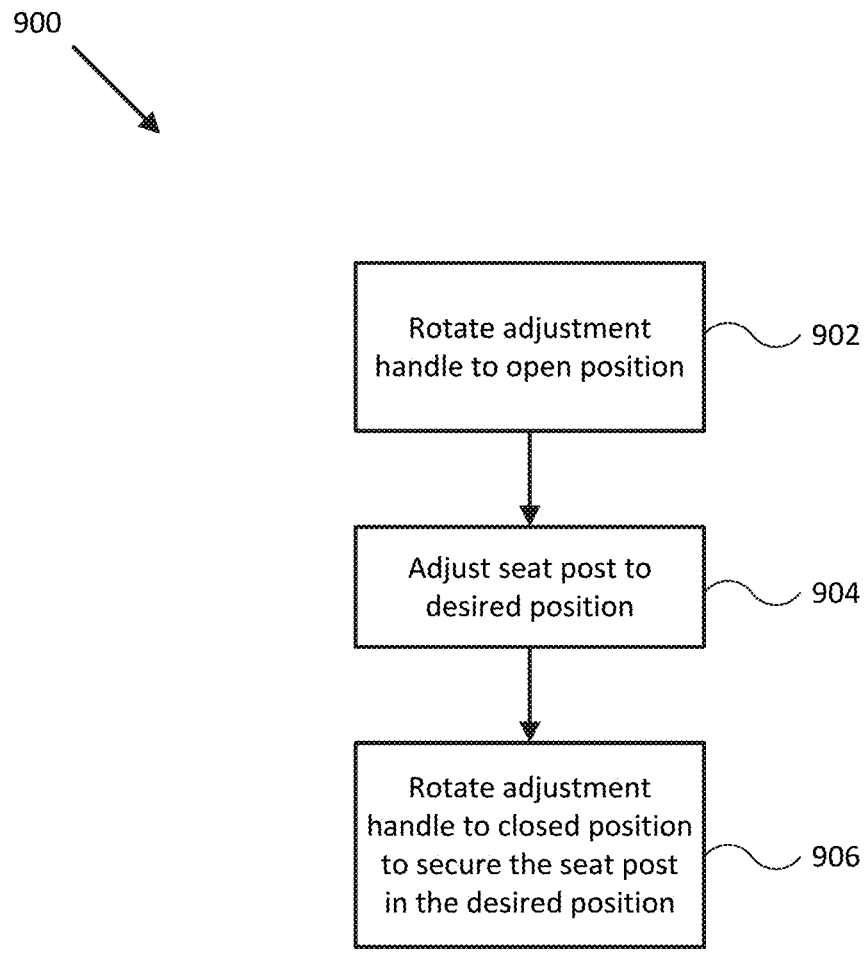
FIG. 9 illustrates a flow diagram of a process to use a seat post clamp assembly to adjust a seat post for a micro-mobility transit vehicle in accordance with an embodiment of the disclosure.

FIG. 9 illustrates a flow diagram of a process 900 to use a seat post clamp assembly (e.g., seat post clamp assembly 400) to adjust a height of a seat assembly in accordance with an embodiment of the disclosure. It should be appreciated that any step, sub-step, sub-process, or block of process 900 may be performed in an order or arrangement different from the embodiments illustrated by FIG. 9. For example, in other embodiments, one or more blocks may be omitted from or added to the process. For illustrative purposes, process 900 is described in reference to FIG. 4 but the following description of process 900 may generally be applied to the additional figures disclosed herein.

In block 902, an adjustment handle of a seat post clamp assembly is rotated to an open position. The adjustment handle may be rotated from a closed position to the open position in some cases. In other cases, the adjustment handle may be rotated from any point within an angle of rotation between the open position and the closed position to the open position. In one or more embodiments, the closed position may be a position in which the adjustment handle has sufficiently engaged a seat clamp of the seat post clamp assembly such that the seat clamp has securely tightened around a seat post tube and consequently a seat post of the seat assembly. Conversely, the open position may be a position in which the adjustment handle has disengaged the seat clamp of the seat post clamp assembly such that the seat post of the seat assembly is loose enough to adjust in height (e.g., extend from the seat post tube or telescope into the seat post tube.) As discussed above, a shape of a barrel of the adjustment handle may be configured such that a force is applied to engage the seat clamp when the adjustment handle is rotated into a closed position. The force may be released to disengage the seat clamp when the adjustment handle is rotated into an open position.

In block 904, the seat post may be adjusted to a desired position. For example, the seat post may have markings transcribed thereon to indicate certain seat post heights. For example, 1, 2, 3, 4, and 5 may be transcribed on the seat post to indicate levels of height. Once the transportation requester is satisfied with the seat post position, the requester may proceed to block 906.

In block 906, the adjustment handle of the seat post clamp assembly is rotated to a closed position to securely lock the seat post in the desired position.

Figure 10:
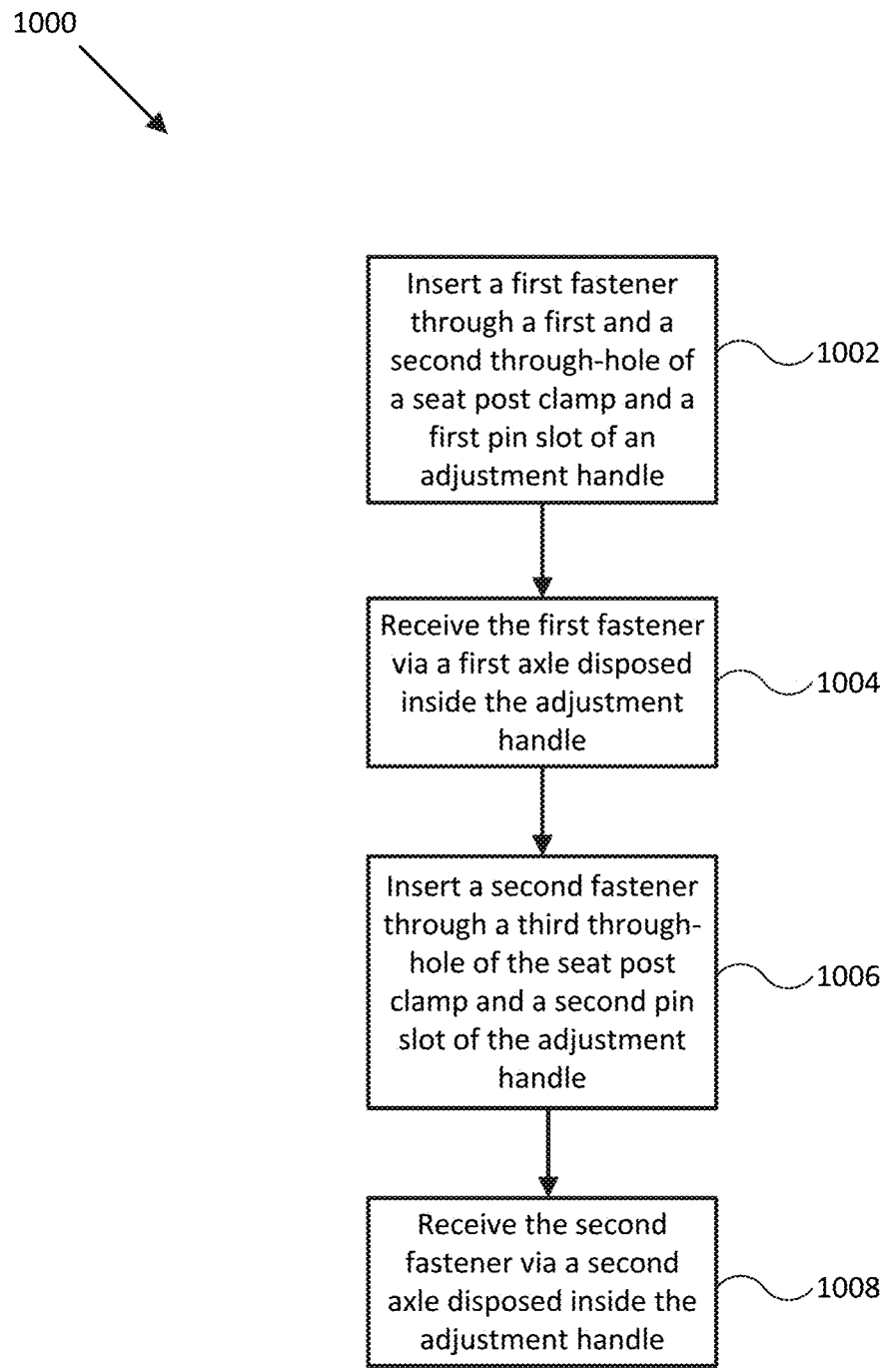
FIG. 10 illustrates a flow diagram of a process for assembling a seat post clamp assembly in accordance with an embodiment of the disclosure.

FIG. 10 illustrates a flow diagram of a process 1000 for assembling a seat post clamp assembly (e.g., seat post clamp assembly 400) in accordance with an embodiment of the disclosure. It should be appreciated that any step, sub-step, sub-process, or block of process 1000 may be performed in an order or arrangement different from the embodiments illustrated by FIG. 10. For example, in other embodiments, one or more blocks may be omitted from or added to the process. For illustrative purposes, process 1000 is described in reference to FIG. 4.

In block 1002, a first fastener may be inserted through a first through-hole and a second through-hole of a seat clamp of the seat post clamp assembly and a fastener slot of an adjustment handle of the seat post clamp assembly.

In block 1004, the first fastener may be received by a first axle disposed inside a barrel of the adjustment handle and configured to receive the first fastener.

In block 1006, a second fastener may be inserted through a third through-hole of a seat clamp and the seat post clamp assembly and a fastener slot of the adjustment handle.

In block 1008, the second fastener may be received by a second axle disposed inside the barrel of the adjustment handle and configured to receive the second fastener.

In one or more embodiments, the first and second fasteners may additionally be inserted through one or more washers placed between the seat clamp and the adjustment handle. Such washers may be configured to receive a force as the adjustment handle is rotated to engage a clamping force of the seat clamp. The adjustment handle may be rotated in an opposing direction to release the force and disengage the clamping force of the seat clamp. For example, a shape of the barrel may cause the seat clamp to engage when the adjustment handle is pressed downward toward a seat post tube that holds a seat post. The shape of the barrel may cause the seat clamp to disengage when the adjustment handle is rotated away from the seat post tube.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A seat post clamp assembly for a micro-mobility transit vehicle, the seat post clamp assembly comprising:
    a seat clamp configured to physically secure the seat post clamp assembly to a seat post tube of the micro-mobility transit vehicle; and
    an adjustment handle coupled to the seat clamp via a first fastener and a second fastener,
    wherein the first fastener is inserted through open ends of the seat clamp, and further through a first fastener slot disposed in the adjustment handle,
    wherein the first fastener is received in a first axle disposed in the adjustment handle,
    wherein the second fastener is inserted through a closed end of the seat clamp and a second fastener slot of the adjustment handle,
    wherein the second fastener is received in a second axle disposed in the adjustment handle, and
    wherein a longitudinal axis of the first axle is collinear with a longitudinal axis of the second axle.

2. The seat post clamp assembly of claim 1, wherein the first fastener slot and the second fastener slot are defined in a surface of a barrel.

3. The seat post clamp assembly of claim 2, wherein a longitudinal axis of the barrel is collinear with each of the respective longitudinal axes of the first axle and the second axle.

4. The seat post clamp assembly of claim 2, wherein at least a portion of the first fastener slot extends between the first axle and the seat clamp along a first radial direction of the barrel, and wherein at least a portion of the second fastener slot extends between the second axle and the seat clamp along a second radial direction of the barrel.

5. The seat post clamp assembly of claim 2, wherein the adjustment handle comprises a loop having a first end and a second end disposed on the surface of the barrel.

6. The seat post clamp assembly of claim 2, wherein the first axle and the second axle are configured to be rotatably disposed within the barrel.

7. The seat post clamp assembly of claim 2, wherein the adjustment handle comprises at least one scalloped notch disposed on the barrel between the first fastener slot and the second fastener slot.

8. The seat post clamp assembly of claim 7, wherein the at least one scalloped notch comprises a contoured surface configured to align with a complementary outer surface of the seat clamp.

9. The seat post clamp assembly of claim 1, wherein at least one of the first fastener or the second fastener comprises a plurality of threaded ends.

10. The seat post assembly of claim 1, wherein at least one of the first fastener or the second fastener comprises a knurled attachment or a knurled end.

11. The seat post assembly of claim 1, wherein the seat clamp comprises an anti-rotation feature configured to constrain rotational motion of the seat clamp relative to the seat post tube.

12. The seat post assembly of claim 11, wherein the anti-rotation feature comprises a through hole.

13. A micro-mobility transit vehicle comprising:
    a seat post tube;
    a seat post disposed in the seat post tube; and
    a seat post clamp assembly comprising:
        a seat clamp configured to physically secure the seat post clamp assembly to the seat post tube; and
        an adjustment handle coupled to the seat clamp via a first fastener and a second fastener,
        wherein the first fastener is inserted through open ends of the seat clamp, and further through a first fastener slot disposed in the adjustment handle,
        wherein the first fastener is received in a first axle disposed in the adjustment handle,
        wherein the second fastener is inserted through a closed end of the seat clamp and a second fastener slot of the adjustment handle,
        wherein the second fastener is received in a second axle disposed in the adjustment handle, and
        wherein a longitudinal axis of the first axle is collinear with a longitudinal axis of the second axle.

14. The micro-mobility transit vehicle of claim 13, wherein the first fastener slot and the second fastener slot are defined in a surface of a barrel.

15. The micro-mobility transit vehicle of claim 14, wherein a longitudinal axis of the barrel is collinear with each of the respective longitudinal axes of the first axle and the second axle.

16. The micro-mobility transit vehicle of claim 14, wherein at least a portion of the first fastener slot extends between the first axle and the seat clamp along a first radial direction of the barrel, and wherein at least a portion of the second fastener slot extends between the second axle and the seat clamp along a second radial direction of the barrel.

17. The micro-mobility transit vehicle of claim 14, wherein the adjustment handle comprises a loop having a first end and a second end disposed on the surface of the barrel.

18. The micro-mobility transit vehicle of claim 17, wherein the adjustment handle comprises at least one scalloped notch disposed on the barrel between the first fastener slot and the second fastener slot.

19. A method for assembling a seat post clamp assembly, the method comprising:
    inserting a first fastener through a first through-hole of a seat clamp, a second through-hole of the seat clamp, and a first fastener slot disposed in a barrel of an adjustment handle of the seat post clamp assembly;
    receiving the first fastener by a first axle disposed in the adjustment handle;
    inserting a second fastener through a third through-hole of the seat clamp and a second fastener slot disposed in the barrel of the adjustment handle; and
    receiving the second fastener by a second axle disposed in the adjustment handle such that a longitudinal axis of the first axle is collinear with a longitudinal axis of the second axle.

20. The method of claim 19, further comprising:
    inserting the first fastener through a first washer disposed between the second through-hole of the seat clamp and the first fastener slot of the adjustment handle; and
    inserting the second fastener through a second washer disposed between the third through-hole of the seat clamp and the second fastener slot of the adjustment handle.

* * * * *